United States Patent
Nishitani

(10) Patent No.: US 10,222,578 B2
(45) Date of Patent: Mar. 5, 2019

(54) LINEAR DRIVING APPARATUS USING VIBRATION WAVE MOTOR AND OPTICAL APPARATUS

(71) Applicant: CANON KABUSHIKI KAISHA, Tokyo (JP)

(72) Inventor: Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/562,588

(22) PCT Filed: Jun. 17, 2016

(86) PCT No.: PCT/JP2016/068742
§ 371 (c)(1),
(2) Date: Sep. 28, 2017

(87) PCT Pub. No.: WO2016/208697
PCT Pub. Date: Dec. 29, 2016

(65) Prior Publication Data
US 2018/0088298 A1    Mar. 29, 2018

(30) Foreign Application Priority Data

Jun. 26, 2015 (JP) .................................. 2015-128543

(51) Int. Cl.
*G02B 7/02* (2006.01)
*G02B 7/04* (2006.01)
(Continued)

(52) U.S. Cl.
CPC ................. *G02B 7/04* (2013.01); *G02B 7/08* (2013.01); *H01L 41/00* (2013.01); *H01L 41/08* (2013.01);
(Continued)

(58) Field of Classification Search
CPC . G02B 7/02; G02B 7/023; G02B 7/04; G02B 7/08; G02B 7/09; G02B 7/10;
(Continued)

(56) References Cited

U.S. PATENT DOCUMENTS

| | | | | |
|---|---|---|---|---|
| 5,644,440 A | * | 7/1997 | Akada | G02B 7/08 |
| | | | | 359/694 |
| 5,812,330 A | * | 9/1998 | Akada | G02B 7/08 |
| | | | | 324/207.21 |

(Continued)

FOREIGN PATENT DOCUMENTS

| | | |
|---|---|---|
| CN | 102540394 A | 7/2012 |
| CN | 103246042 A | 8/2013 |

(Continued)

OTHER PUBLICATIONS

International Preliminary Report on Patentability dated Jan. 4, 2018, in International Application No. PCT/JP2016/068742.

(Continued)

*Primary Examiner* — Loha Ben
(74) *Attorney, Agent, or Firm* — Venable LLP

(57) ABSTRACT

In a linear driving apparatus including a vibration wave motor, a driving target body movable in a moving direction, a transmission member which is held by the driving target body and abuts against an abutment part of a moving member to synchronously move the vibration wave motor and the driving target body, and a biasing member which gives a biasing force between the transmission member and the abutment part, the direction of a pressure contact force which a vibrator receives from a friction member and the direction of a biasing contact force which the abutment part receives from the biasing member are parallel and opposite (Continued)

to each other, and the load center of the distribution load of the biasing contact force falls within the range of the vibrator.

7 Claims, 16 Drawing Sheets

(51) Int. Cl.
| | |
|---|---|
| H02N 2/00 | (2006.01) |
| H02N 2/02 | (2006.01) |
| H01L 41/00 | (2013.01) |
| H01L 41/08 | (2006.01) |
| G02B 7/08 | (2006.01) |
| H02N 2/16 | (2006.01) |
| B06B 1/00 | (2006.01) |
| G03B 3/10 | (2006.01) |

(52) U.S. Cl.
CPC ............ *H02N 2/001* (2013.01); *H02N 2/006* (2013.01); *H02N 2/026* (2013.01); *B06B 1/00* (2013.01); *G02B 7/02* (2013.01); *G03B 3/10* (2013.01); *H02N 2/00* (2013.01); *H02N 2/02* (2013.01); *H02N 2/16* (2013.01)

(58) Field of Classification Search
CPC . G02B 15/14; G03B 3/10; G03B 3/12; G03B 17/00; H02N 2/00; H02N 2/001; H02N 2/003; H02N 2/004; H02N 2/006; H02N 2/02; H02N 2/021; H02N 2/026; H02N 2/043; H02N 2/103; H02N 2/16; H02N 2/186; H01L 41/00; H01L 41/04; H01L 41/042; H01L 41/08; H01L 41/0805; B06B 1/00; B06B 1/0644; B06B 1/0648; B06B 1/0688; H02K 7/08; H02K 33/00; H02K 35/00
USPC ................ 359/694, 696, 698, 814, 822–824; 396/77, 79–82, 133; 310/12.01, 15, 17, 310/311, 320, 323.01–323.07, 328; 348/335, 341, 345; 340/566
See application file for complete search history.

(56) References Cited

U.S. PATENT DOCUMENTS

| | | | | |
|---|---|---|---|---|
| 7,489,458 | B2* | 2/2009 | Su | ............... G02B 7/102 348/335 |
| 8,164,233 | B2* | 4/2012 | Mukae | .............. G02B 27/646 310/316.01 |
| 8,643,252 | B2 | 2/2014 | Oda et al. | |
| 8,792,051 | B2 | 7/2014 | Kudo | |
| 9,219,429 | B2* | 12/2015 | Yamanaka | ............ H02N 2/026 |
| 9,397,586 | B2* | 7/2016 | Yamasaki | ............. H02N 2/026 |
| 9,564,837 | B2 | 2/2017 | Oda et al. | |
| 9,653,675 | B2* | 5/2017 | Yamanaka | .......... H01L 41/0536 |
| 9,660,556 | B2* | 5/2017 | Yamamoto | ............ H02N 2/026 |
| 9,680,399 | B2* | 6/2017 | Yamanaka | ............ H02N 2/026 |
| 9,893,651 | B2* | 2/2018 | Yamamoto | ............ H02N 2/026 |
| 2005/0067922 | A1 | 3/2005 | Sasaki et al. | |
| 2014/0293463 | A1 | 10/2014 | Yamanaka et al. | |
| 2016/0118913 | A1 | 4/2016 | Nishitani et al. | |
| 2016/0126449 | A1 | 5/2016 | Osawa et al. | |
| 2017/0005595 | A1 | 1/2017 | Nishitani | |
| 2017/0149359 | A1* | 5/2017 | Nishitani | ............. B06B 1/0644 |

FOREIGN PATENT DOCUMENTS

| | | |
|---|---|---|
| CN | 103513386 A | 1/2014 |
| CN | 104104265 A | 10/2014 |
| JP | 2012-016107 A | 1/2012 |
| JP | 2012-029495 A | 2/2012 |
| JP | 2014-093871 A | 5/2014 |
| JP | 2014-212682 A | 11/2014 |

OTHER PUBLICATIONS

International Search Report and Written Opinion dated Sep. 20, 2016 in International Application No. PCT/JP2016/068742.
Office Action dated Oct. 9, 2018, in Chinese Patent Application No. 201680037066.5.

* cited by examiner

LINEAR DRIVING APPARATUS USING VIBRATION WAVE MOTOR AND OPTICAL APPARATUS

TECHNICAL FIELD

The present invention relates to a linear driving apparatus using a vibration wave motor and an optical apparatus.

BACKGROUND ART

In a conventional ultrasonic motor, a high-frequency voltage is applied to a piezoelectric element to ultrasonically vibrate a vibrator fixed to the piezoelectric element. The ultrasonic vibration of the vibrator generates a driving force between a friction member and the vibrator pressed against the friction member. This motor can maintain high output even in a compact size. For example, PTL 1 discloses an ultrasonic motor using a compact vibrator. In addition, various contrivances for the efficient transmission of a driving force to a driving target body have been introduced into the ultrasonic motor. For example, in the ultrasonic motor disclosed in PTL 2, a rolling member is clamped by the resultant force of a pressing force given to the vibrator or its reactive force and the biasing force of a transmission member supported by a driving target body.

CITATION LIST

Patent Literature

PTL 1: Japanese Patent Application Laid-Open No. 2012-16107
PTL 2: Japanese Patent Application Laid-Open No. 2014-212682

In order to downsize and simplify the ultrasonic motor disclosed in PTL 2, there is proposed a sliding structure like that shown in FIG. 16, which is provided with guide shafts 600 extending in the moving direction (the X direction shown in FIG. 16) of a moving member 400, with sliding holes 400a fitted on the guide shafts 600 being formed in the moving member 400. In this sliding structure, the guide shafts 600 and the sliding holes 400a slidably guide the moving member 400. This structure makes it possible to decide a size L in the moving direction X of the moving member 400 regardless of the movement amount of the moving member 400, and hence to implement the moving member 400 having the same length as that of the vibrator main body. In addition, since rolling balls can be omitted, the apparatus can be downsized and simplified. In this arrangement, however, the resultant force of the reactive force of the pressing force given to the vibrator and the biasing force of the transmission member supported by the driving target body acts as a drag (in a direction vertical to the drawing surface) on the guide shafts 600 and the sliding holes 400a. This increases the frictional force and decreases the driving force of the ultrasonic motor.

SUMMARY OF INVENTION

In order to solve the above problems, the present invention provides a linear driving apparatus using a vibration wave motor which can be downsized and simplified without reduction in driving force and an optical apparatus.

Technical Problem

In order to solve the above problems, a linear driving apparatus according to the present invention is characterized by comprising a vibration wave motor including a vibrator including a piezoelectric element which generates vibration, a friction member fixed to face the vibrator, a press member which gives a pressing force between the vibrator and the friction member, a moving member which is configured to move in predetermined moving direction, a coupling member which couples the vibrator to the moving member and synchronously moves the vibrator and the moving member, and a guide member which slidably guides the moving member in the moving direction, a driving target body which is configured to move in the moving direction, a transmission member which is supported by the driving target body, abuts against an abutment part of the moving member, and synchronously moves the vibration wave motor and the driving target body, and a biasing member which gives a biasing force between the transmission member and the abutment part, wherein a direction of a pressure contact force which the vibrator receives from the friction member and a direction of a biasing contact force which the abutment part receives from the biasing member are parallel and opposite directions, and a load center of a distribution load of the biasing contact force falls within a range of the vibrator.

Advantageous Effects of Invention

According to the present invention, it is possible to provide a vibration wave motor which can be downsized and simplified without reduction in the driving force of the vibration wave motor and a linear driving apparatus using the vibration wave motor.

Further features of the present invention will become apparent from the following description of exemplary embodiments with reference to the attached drawings.

DESCRIPTION OF EMBODIMENTS

Preferred embodiments of the present invention will now be described in detail in accordance with the accompanying drawings.

The arrangement of a linear driving apparatus using a vibration wave motor (ultrasonic motor) 10 according to the present invention will be described below with reference to the accompanying drawings. Assume that the moving direction of a vibrator 1 of the vibration wave motor 10 is defined as the X direction, the pressing direction of a press member 3 is defined as the Z direction, and a direction perpendicular to the X and Z directions is defined as the Y direction. With regard to all the drawings, the X, Y, and Z directions are defined as described above.

Figure 1A:
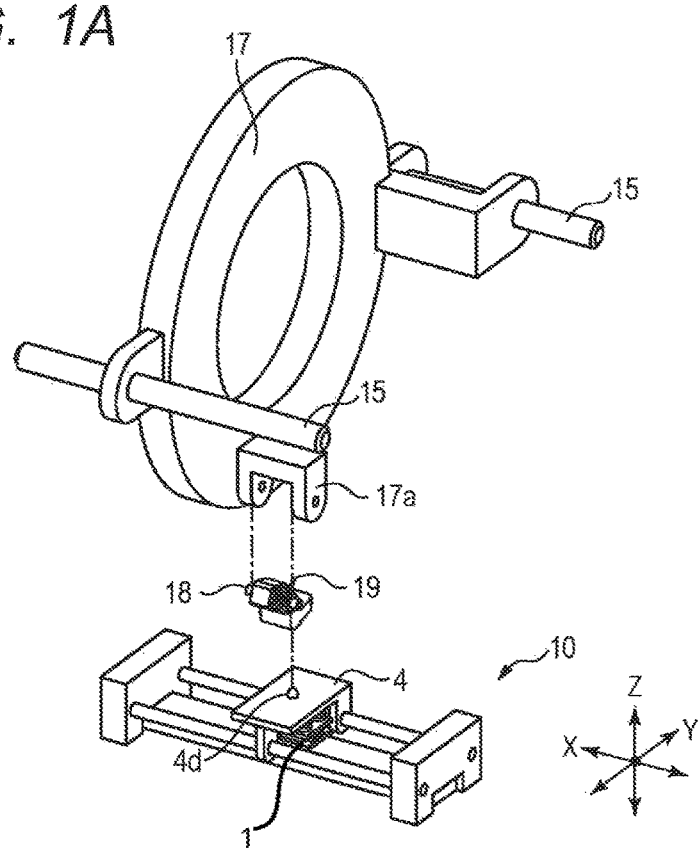
FIG. 1A is an exploded perspective view of a linear driving apparatus using a vibration wave motor 10 according to an embodiment of the present invention.
Figure 1B:
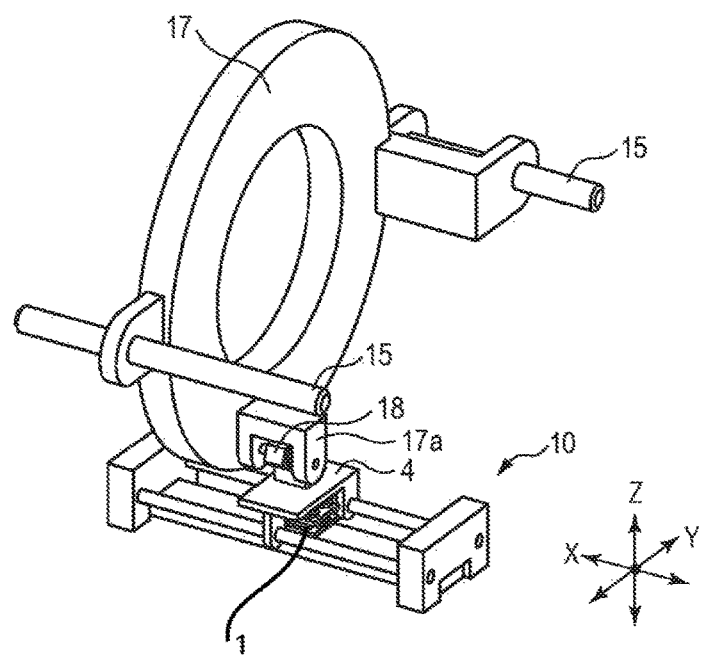
FIG. 1B is a perspective view of the linear driving apparatus.

The linear driving apparatus using the vibration wave motor 10 according to this embodiment will be described first. FIG. 1A is an exploded perspective view showing the linear driving apparatus using the vibration wave motor 10, which is exploded in the Z direction. FIG. 1B shows a completed linear driving apparatus. A driving target body 17 is a lens frame used for a photographing apparatus as a driving target. The driving target body 17 can reciprocally move in a moving direction X of a moving member 4 while being guided by guide shafts 15 when the vibration wave motor outputs a driving force. Although the embodiment has exemplified an optical apparatus using the linear driving apparatus with the driving target body 17 being a lens frame used for a photographing apparatus, the driving target body 17 can be applied to a component other than the lens frame.

A transmission member 18 is supported by a support portion 17a of the driving target body 17. The transmission member 18 is mounted on the moving member 4, together with a biasing member 19, so as to abut against an abutment part 4d of the moving member 4. The linear driving apparatus using the vibration wave motor 10 in the completed state shown in FIG. 1B is configured such that a driving force is transmitted from the vibrator 1 as a drive source (to be described later) to a coupling member 5, the moving member 4, the abutment part 4d, the transmission member 18, and the driving target body 17 in the order named to reciprocally move the driving target body 17 in the X direction.

Figure 2A:
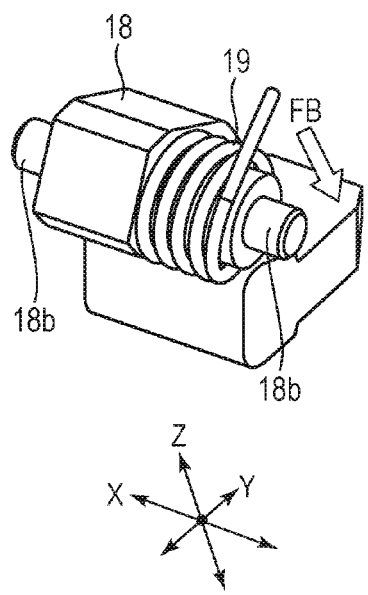
FIG. 2A is a perspective view of a transmission member 18 and a biasing member 19 of the linear driving apparatus according the embodiment of the present invention.
Figure 2B:
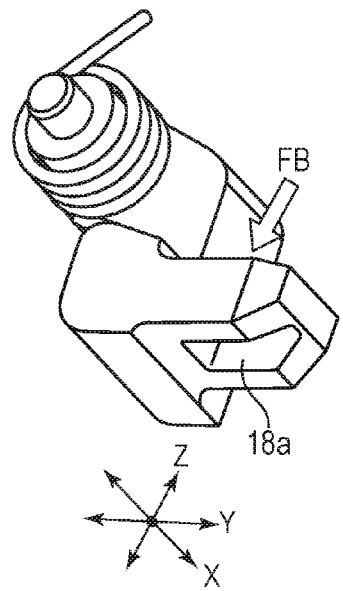
FIG. 2B is a perspective view of a transmission member 18 and a biasing member 19 of the linear driving apparatus according the embodiment of the present invention.
Figure 2C:
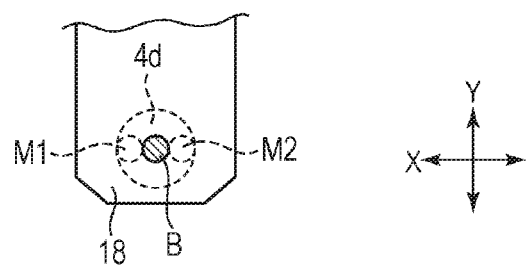
FIG. 2C is an enlarged view of an abutment portion.
Figure 2D:
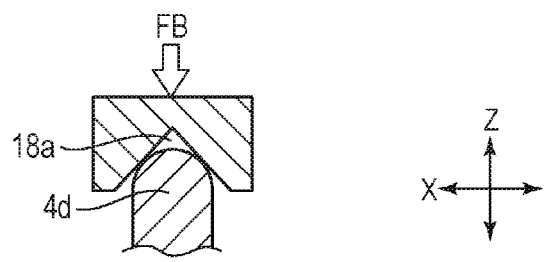
FIG. 2D is a sectional view of the abutment portion.

FIGS. 2A and 2B are perspective views, respectively, of the transmission member 18 and the biasing member 19. FIG. 2A is a view seen from above in the Z direction. FIG. 2B is a view seen from below in the Z direction. FIGS. 2C and 2D are enlarged views, respectively, of an abutment portion where the transmission member 18 abuts against the abutment part 4d of the moving member 4. FIG. 2C is a projection view seen from the Z direction. FIG. 2D is a sectional view seen from the Y direction. The transmission member 18 is supported by the support portion 17a of the driving target body 17 described above and abuts against the abutment part 4d of the moving member 4 to synchronously move the moving member and the driving target body 17. The transmission member 18 has a concave portion 18a. The concave portion 18a is configured to come into biasing contact with the abutment part 4d. In this embodiment, the transmission member 18 is supported by the support portion 17a so as to be freely pivotal about a shaft 18b. It is however possible to select an arrangement in which the transmission member 18 is supported to be linearly movable. In addition, in the embodiment, a concave shape is formed on the transmission member 18 side, and a convex shape is formed on the abutment part 4d side. It is however possible to select an arrangement in which convex and concave portions are formed on the opposite sides to those in the above arrangement.

The biasing member 19 is a torsion coil spring, which applies a biasing force to the transmission member 18 to provide a biasing contact force FB between the transmission member 18 and the abutment part 4d. In this embodiment, the biasing member 19 is a torsion coil spring. However, it is possible to select a compression spring, tension spring, or leaf spring as long as it can provide the biasing contact force FB.

Referring to FIG. 2C, since the concave portion 18a has an almost V-shaped cross-section (see FIG. 2D), the biasing contact force FB generated by the biasing member 19 has two distribution load areas M1 and M2. A load center B of the distribution loads corresponds to the midpoint of them. Although this embodiment has exemplified the case in which there are two distribution load areas, even if the number of distribution load areas changes in accordance with the shapes of the transmission member 18 and the abutment part 4d, the load center B of the distribution loads can be regarded in the same manner.

Figure 3A:
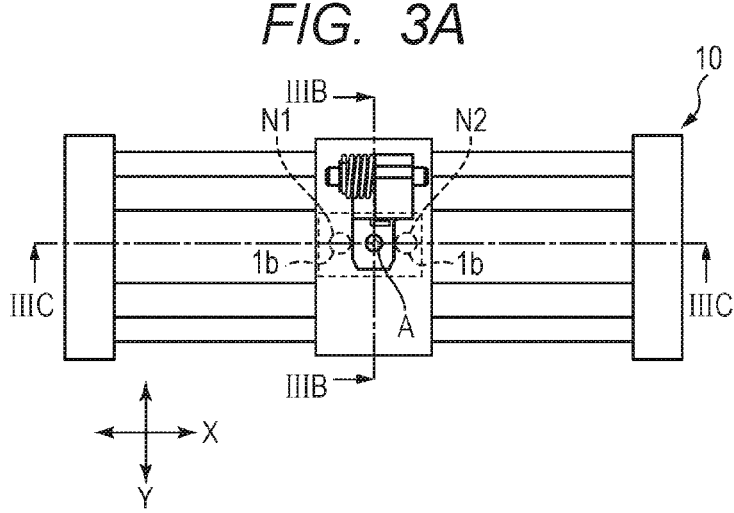
FIG. 3A is a view showing the vibration wave motor 10 according to the embodiment of the present invention, to which the transmission member 18 and the biasing member 19 are attached.
Figure 3B:
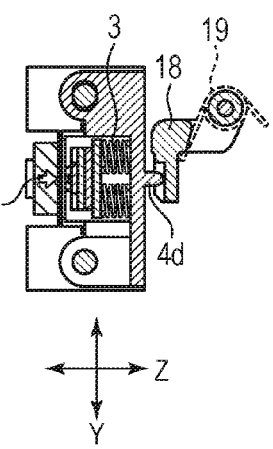
FIG. 3B is a view showing the vibration wave motor 10 according to the embodiment of the present invention, to which the transmission member 18 and the biasing member 19 are attached.
Figure 3C:
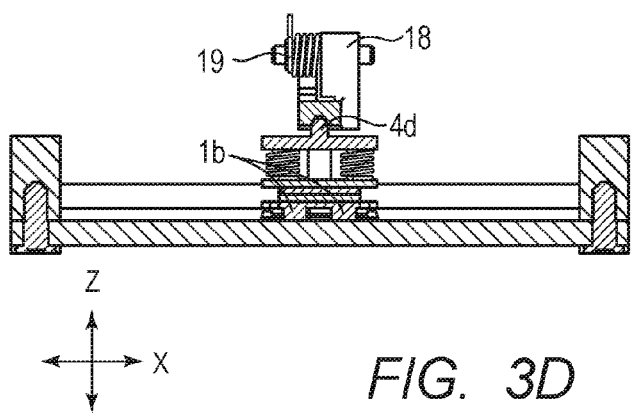
FIG. 3C is a view showing the vibration wave motor 10 according to the embodiment of the present invention, to which the transmission member 18 and the biasing member 19 are attached.
Figure 3D:
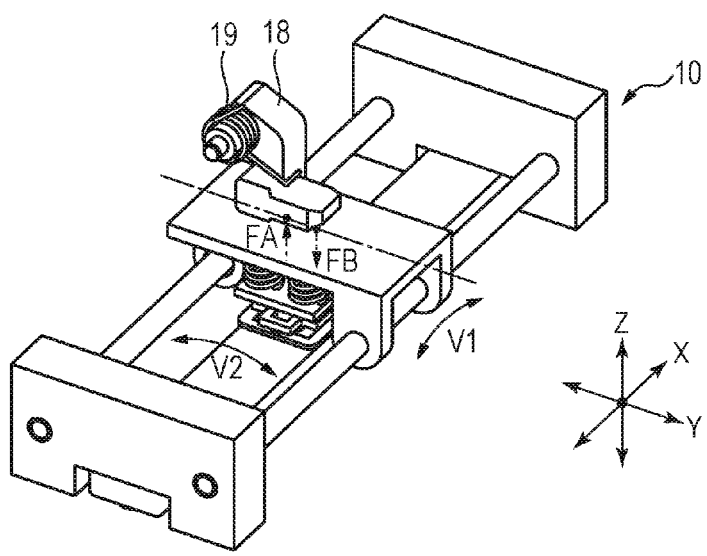
FIG. 3D is a view showing the vibration wave motor 10 according to the embodiment of the present invention, to which the transmission member 18 and the biasing member 19 are attached.

A portion through which the vibration wave motor 10 used for the linear driving apparatus according to this embodiment transmits a driving force to the driving target body 17 will be described next. FIG. 3A is a plan view showing how the transmission member 18 is mounted on the vibration wave motor 10 and biased by the biasing member 19. FIG. 3B is a sectional view taken along a cut line IIIB-IIIB in FIG. 3A. FIG. 3C is a sectional view taken along a cut line IIIC-IIIC in FIG. 3A. FIG. 3D is a perspective view.

Referring to FIG. 3A, the distribution load areas of a pressure contact force FA between the vibrator 1 and a friction member 2 correspond to the ranges of protruding portions 1b of the vibrator 1. Therefore, the pressure contact force FA has two distribution load areas N1 and N2. A load center A of the distribution load areas corresponds to the midpoint of the distribution loads. Although this embodiment has exemplified the case in which there are two distribution load areas, even if the number of distribution load areas changes in accordance with the number of protruding portions 1b of the vibrator 1, the load center A of the distribution loads can be regarded in the same manner.

FIG. 3D shows how the pressure contact force FA and the biasing contact force FB act. If the load center A coincides with the load center B, a couple V1 around the Y-axis almost perpendicular to the moving direction X can be reduced to 0. Likewise, a couple V2 around the X-axis in the moving direction can be reduced to 0. Note that the load center A and the load center B are emphatically shown.

EXAMPLE 1

Figure 4A:
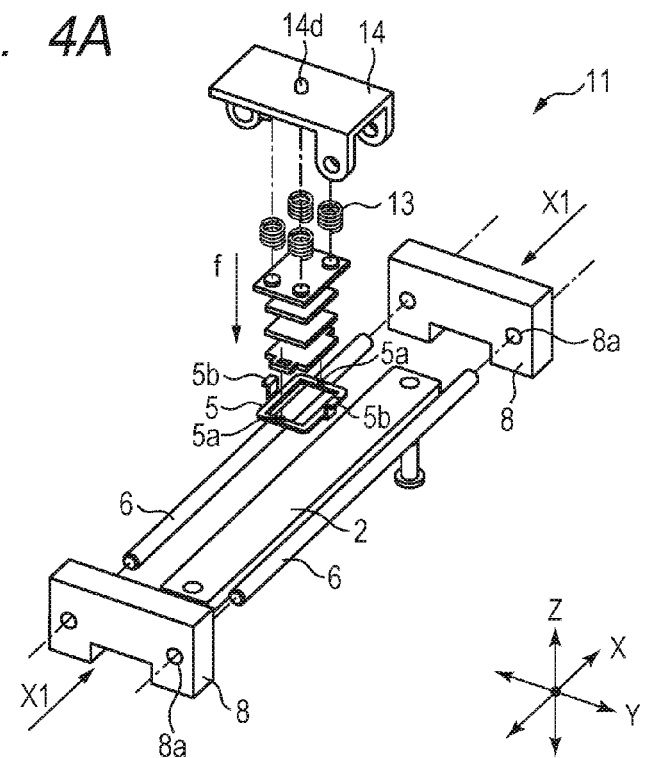
FIG. 4A is an exploded perspective view of a vibration wave motor 11 according to Example 1 of the present invention.
Figure 4B:
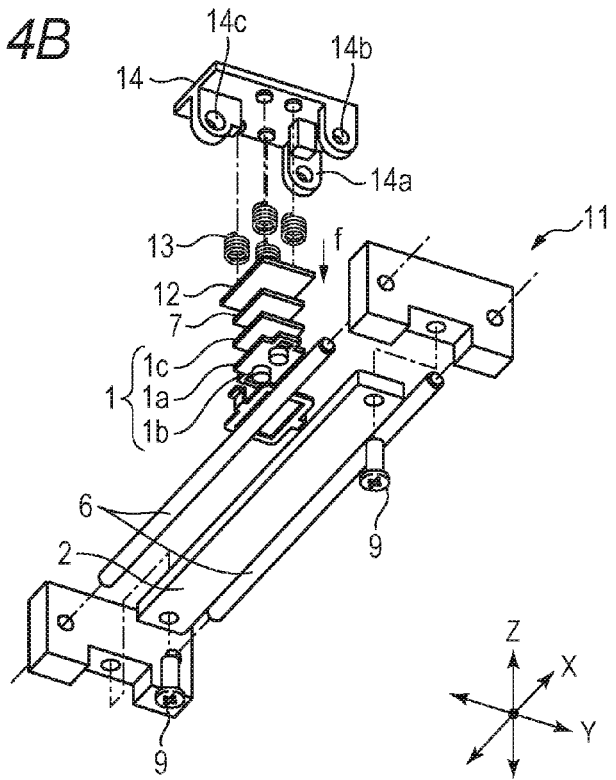
FIG. 4B is an exploded perspective view of a vibration wave motor 11 according to Example 1 of the present invention.

The arrangement of a vibration wave motor 11 according to Example 1 which is used for the linear driving apparatus according to the embodiment of the present invention will be described. FIGS. 4A and 4B are exploded perspective views, respectively, of the vibration wave motor 11. FIG. 4A is a view seen from above in the Z direction. FIG. 4B is a view seen from below in the Z direction.

A vibrator 1 is constituted by a plate portion 1a, two protruding portions 1b, and a piezoelectric element 1c. The protruding portions 1b and the plate portion 1a can be integrally molded or assembled as separate components. The piezoelectric element 1c has a predetermined area polarized and is attached to the plate portion 1a. A power feeding means (not shown) applies a high-frequency voltage to the piezoelectric element 1c to generate vibration (ultrasonic vibration) with a frequency in an ultrasonic region. Since PTL 1 has described the principle of obtaining a driving force from the vibrator 1 by generating this vibration, a description of it will be omitted. Although Example 1 has exemplified the case in which the vibrator 1 has the two protruding portions 1b, the number of protruding portions 1b is selectable in accordance with a desired driving force. The vibrator 1 can reciprocally move in the X direction shown in FIGS. 4A and 4B.

A friction member 2 is arranged to face the vibrator 1 and is fixed to fixing members 8. Example 1 exemplifies a case in which the friction member 2 has a plate-like shape. However, a round bar shape or the like can also be selected as the shape of the friction member 2. In addition, a material such as a metal or ceramic material can be selected for the friction member 2 within a range that satisfies requirements for mechanical characteristics such as rigidity and surface properties.

Press members 13 are four compression springs. The lower end portions of the press members 13 abut against a press plate 12 to give pressing forces f to the vibrator 1 through a felt member 7 in the direction shown in FIGS. 4A and 4B. The felt member 7 is provided to prevent the attenuation of vibration. The press plate 12 is provided to give the pressing forces f to the entire piezoelectric element 1c. Example 1 has exemplified the case in which the press members 13 are the compression springs. However, torsion coil springs, tension springs, leaf springs, or the like can be selected as the press members 13. The number of springs can be freely selected as long as the sum of the pressing forces f of the press members 13 is appropriate. In addition, Example 1 exemplifies an arrangement in which areas where the press members 13 exist overlap an area where the vibrator 1 exists when being projected on an X-Y plane.

A moving member 14 can move in a moving direction X of the vibrator 1 and holds the upper end portions of the press members 13. The moving member 14 includes sliding parts 14a, 14b, and 14c as holes to be fitted on guide members 6 (to be described later) and an abutment part 14d which abuts against a transmission member 18. The sliding parts 14a, 14b, and 14c and the abutment part 14d can be integrally molded or assembled as separate components to the moving member 14.

A coupling member 5 is coupled to the vibrator 1 through first coupling portions 5a or coupled to the moving member 14 through second coupling portions 5b to couple the vibrator 1 to the moving member 14. This makes it possible to synchronously move the vibrator 1 and the moving member 14. The coupling member 5 has a property of exhibiting low rigidity in the Z direction so as not to inhibit a pressure contact force FA between the vibrator 1 and the friction member 2 and exhibiting high rigidity in the X direction to allow the vibrator 1 and the moving member 14 to synchronously move. When being coupled to the vibrator 1 through the first coupling portions 5a, the coupling member 5 is fixed to portions of the vibrator 1 which correspond to nodes of vibration or similar portions at which vibration is small by a method like bonding or welding (not shown), so as not to inhibit vibration of the vibrator 1. When being coupled to the moving member 14 through the second coupling portions 5b, the coupling member 5 is fixed to the moving member 14 by a method like bonding, welding, or screw fastening (not shown). Example 1 has exemplified the case in which the coupling member 5 is formed from one member having a frame-like shape. However, the coupling member 5 may be formed from a plurality of members or an arbitrary material and shape can be selected for the coupling member 5 within a range that satisfies the requirement for the above rigidity characteristic.

The guide members 6 are round bars for slidably guiding the moving member 14 in the X direction. The guide members 6 are sliding guides, without rolling balls and the like, which are fitted in the sliding parts 14a, 14b, and 14c of the moving member 14. Example 1 exemplifies a case in which the round bars are used. However, square bars or plate members can be selected as long as the shapes of the sliding parts 14a, 14b, and 14c are made to comply with the guide members.

The fixing members 8 are supported by fixing portions (not shown), assembled in an X1 direction shown in FIG. 4A, and hold the guide members 6 by fitting them in four holes 8a. The friction member 2 is then fixed to the fixing members 8 by being fastened with screws 9. As a holding method for the guide members 6 and a fixing method for the friction member 2, arbitrary methods can be selected.

Figure 5A:
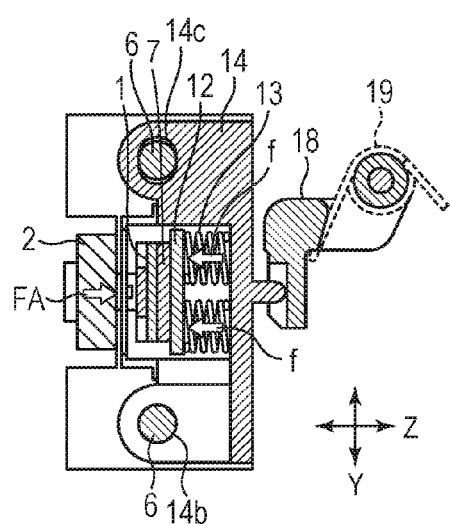
FIG. 5A is a view showing the effect of Example 1 of the present invention.
Figure 5B:
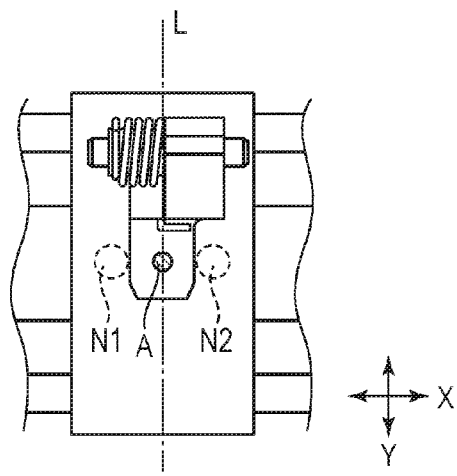
FIG. 5B is a view showing the effect of Example 1 of the present invention.
Figure 5C:
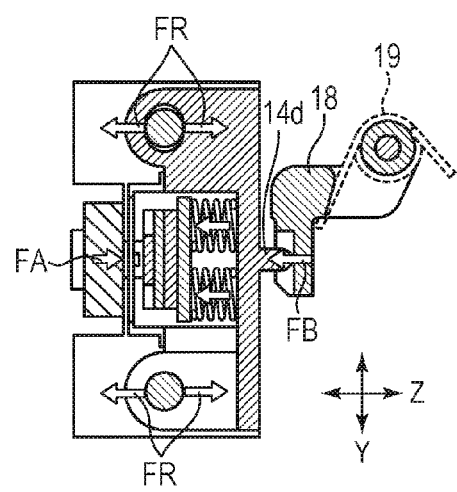
FIG. 5C is a view showing the effect of Example 1 of the present invention.
Figure 5D:
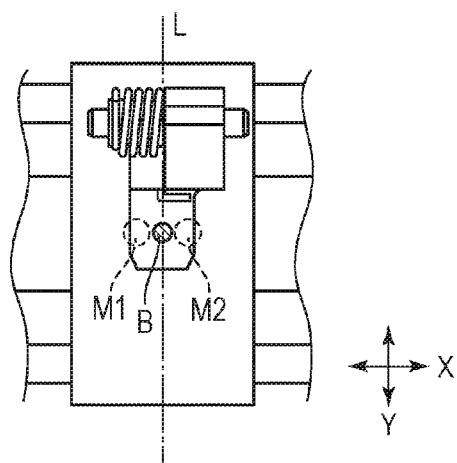
FIG. 5D is a view showing the effect of Example 1 of the present invention.
Figure 5E:
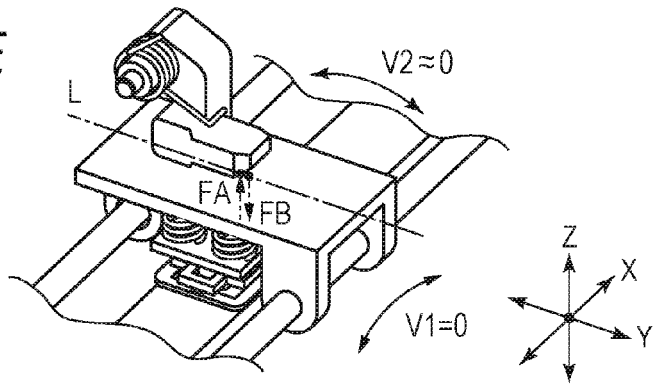
FIG. 5E is a view showing the effect of Example 1 of the present invention.

Forces generated inside the vibration wave motor 11 according to Example 1 will be described next. FIGS. 5A and 5C are sectional views, respectively, near an abutment portion between the moving member 14 and the transmission member 18. FIGS. 5B and 5D are partially enlarged views, respectively, on an X-Y plane. FIG. 5E is a perspective view. The vibrator 1, the felt member 7, the press plate 12, the press members 13, the moving member 14, the transmission member 18, and a biasing member 19 are components which move in the X direction, to which the friction member 2 and the guide members 6 are fixed.

The pressure contact force FA between the vibrator 1 and the friction member 2 will be described first. As shown in FIG. 5A, the press members 13 generate pressing forces f in the direction shown in FIG. 5A to press the vibrator 1 against the friction member 2 through the press plate 12 and the felt member 7. Reactive forces of the pressing forces f are then generated. The vibrator 1 receives the reactive forces from the friction member 2. That is, the pressure contact force FA is generated between the moving vibrator 1 and the fixed friction member 2. In addition, as shown in FIG. 5B, the pressure contact force FA between the vibrator 1 and the friction member 2 has distribution load areas N1 and N2, which are the projected areas of the protruding portions 1b of the vibrator 1. A load center A is the same as that described above.

A biasing contact force FB between the transmission member 18 and the abutment part 14d will be described next. As shown in FIG. 5C, when the biasing member 19 generates a biasing force, the transmission member 18 is biased by the biasing force to abut against the abutment part 14d. As a result, the biasing contact force FB in the direction shown in FIG. 5C is generated between the moving transmission member 18 and the abutment part 14d. In addition, as shown in FIG. 5D, the biasing contact force FB between the transmission member 18 and the abutment part 14d has distribution load areas M1 and M2, which are the projected areas of the contact areas of the abutment part 14d with respect to a concave portion 18a of the transmission member 18. A load center B between them is the same as that described above.

In this case, the vibrator 1 receives the pressing forces f from the press member 13 through the press plate 12 and the felt member 7, and the moving member 14 directly receives forces in an opposite direction to the pressing forces f from the press member 13. The vibrator 1 comes into contact with the friction member 2, and the position of the moving member 14 is restricted by the guide members 6. When, therefore, the five components, namely the vibrator 1, the felt member 7, the press plate 12, the press members 13, and the moving member 14 are regarded as an integral unit, external forces acting on the unit should balance each other (the above five components regarded as an integral unit will be referred to as a "moving body" hereinafter).

As shown in FIG. 5C, the moving body receives the pressure contact force FA between the vibrator 1 and the friction member 2 and the biasing contact force FB between the transmission member 18 and the abutment part 14d. The directions of forces acting on the load centers A and B are opposite to each other. If the pressure contact force FA and the biasing contact force FB are equal in magnitude and the load centers A and B coincide with each other on the projections on an X-Y plane, the moving body can balance with only the pressure contact force FA and the biasing contact force FB, and no drag FR is generated between the moving body and the guide members 6. If the pressure contact force FA differs in magnitude from the biasing contact force FB, the moving body cannot balance with only the pressure contact force FA and the biasing contact force FB. In this case, the drag FR corresponding to the difference between the pressure contact force FA and the biasing contact force FB is generated between the moving body and the guide members 6 in either of the directions in FIG. 5C, in addition to the pressure contact force FA and the biasing contact force FB, thereby allowing the moving body to balance.

Features of Example 1 will be described below. The first feature of Example 1 is that the load center A of the distribution load of the pressure contact force FA and the load center B of the distribution load of the biasing contact force FB are aligned on a straight line L along a direction Y perpendicular to the moving direction X and a direction Z of the pressure contact force FA, as shown in FIGS. 5B, 5D, and 5E. The second feature of Example 1 is that the direction of the pressure contact force FA and the direction of the biasing contact force FB are parallel and opposite, as shown in FIGS. 5A, 5C, and 5E.

According to the first feature, since no couple V1 around the Y-axis shown in FIG. 5E is generated in the moving body, the moving body can reciprocally move with high position accuracy without tilting around the Y-axis. In addition, according to the second feature, the drag FR generated between the moving member 14 and the guide members 6 corresponds to the difference between the pressure contact force FA and the biasing contact force FB, and the drag FR and frictional force are reduced. This can prevent a decrease in the driving force of the vibration wave motor 11. In addition, making the pressure contact force FA almost equal to the biasing contact force FB can further reduce the drag FR and the frictional force. This can further prevent a decrease in the driving force of the vibration wave motor 11. As a consequence, even if the sliding guide method is used as a guide method, a decrease in the driving force of the vibration wave motor 11 can be avoided.

As described above, the linear driving apparatus using the vibration wave motor 11 according to Example 1 can use the sliding guide method as a guiding method for the moving member 14, which allows downsizing and simplification without decreasing the driving force of the vibration wave motor 11. According to Example 1, as shown in FIGS. 5B and 5D, on the projections on the X-Y plane, the load center A of the distribution load of the pressure contact force FA and the load center B of the distribution load of the biasing contact force FB fall within the range of the vibrator 1. In addition, the load center A of the distribution load of the pressure contact force FA and the load center B of the distribution load of the biasing contact force FB are aligned on the straight line L along the direction Y perpendicular to the moving direction X and the direction Z of the pressure contact force FA and almost coincide with each other. In this case, since the couple V2 shown in FIG. 5E is hardly generated, it is possible to reduce the drag FR and frictional force and a decrease in the driving force of the vibration wave motor 11 to almost 0 by making the pressure contact force FA almost equal to the biasing contact force FB.

EXAMPLE 2

Figure 6A:
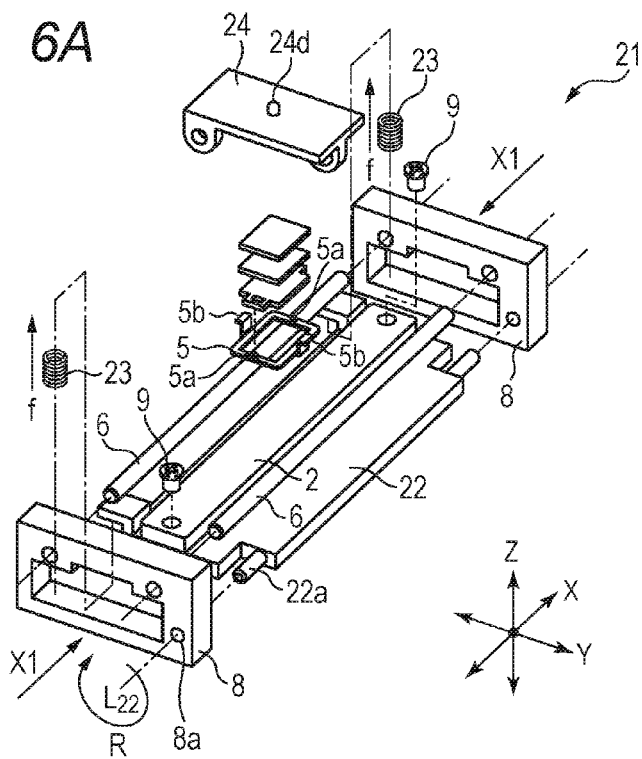
FIG. 6A is an exploded perspective view of a vibration wave motor 21 according to Example 2 of the present invention.
Figure 6B:
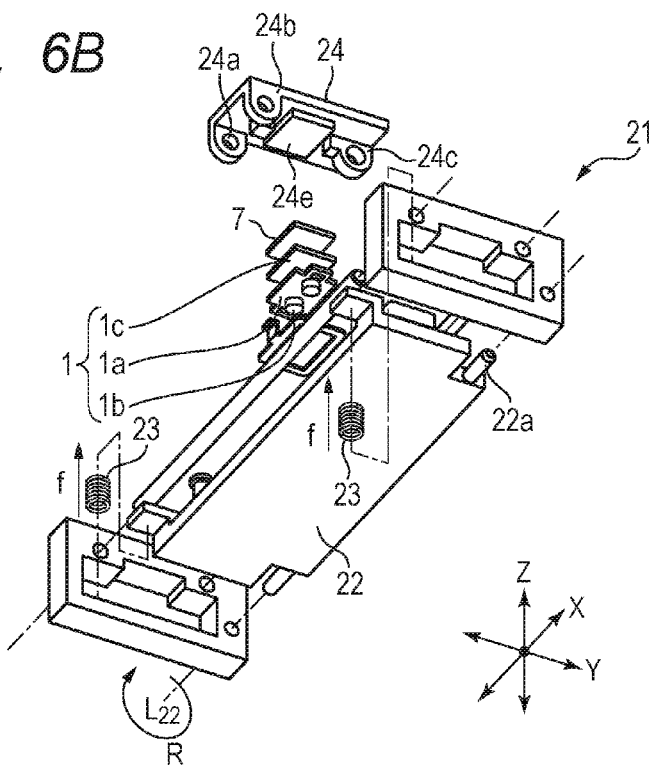
FIG. 6B is an exploded perspective view of a vibration wave motor 21 according to Example 2 of the present invention.

The arrangement of a vibration wave motor 21 according to Example 2 used for the linear driving apparatus according to the embodiment of the present invention will be described. FIGS. 6A and 6B are exploded perspective views of the vibration wave motor 21. FIG. 6A is a view seen from above in the Z direction. FIG. 6B is a view seen from below in the Z direction. A vibrator 1 and a friction member 2 are the same as those in Example 1. Note however that the friction member 2 is fixed to a press plate 22 with screws 9. The press plate 22 is provided with a shaft 22a and can pivot about a straight line L22 in the R direction shown in FIGS. 6A and 6B.

Press members 23 are two compression springs, which are assembled such that the lower end portions of the press members 23 are supported by fixing members 8, and the upper end portions are supported by the press plate 22. The press members 23 act on the press plate 22 to give pressing forces f between the vibrator 1 and the friction member 2 in the direction shown in FIGS. 6A and 6B. A moving member 24 can move in a moving direction X, and supports the vibrator 1 at a support part 24e through a felt member 7. In addition, the moving member 24 includes sliding parts 24a, 24b, and 24c as holes to be fitted on guide members 6 and an abutment part 24d against which a transmission member 18 abuts. The coupling member 5 and the guide members are the same as those in Example 1. The fixing members 8 are supported by fixing portions (not shown), and are assembled in the X1 direction shown in FIG. 6A to hold the guide members 6 and the press plate 22 by fitting them in holes 8a. With regard to each component described above, other forms can be selected as in Example 1. The transmission member 18 and a biasing member 19 through which the vibration wave motor 21 used for the linear driving apparatus according to Example 2 transmits a driving force to a driving target body 17 are the same as those in Example 1, and hence a description of them will be omitted.

Figure 7A:
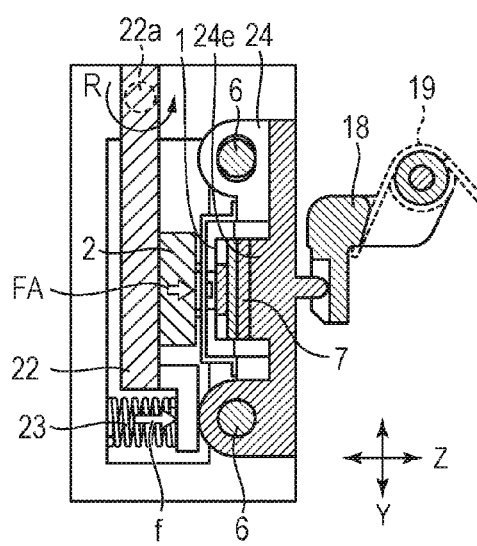
FIG. 7A is a view showing the effect of Example 2 according to the present invention.
Figure 7B:
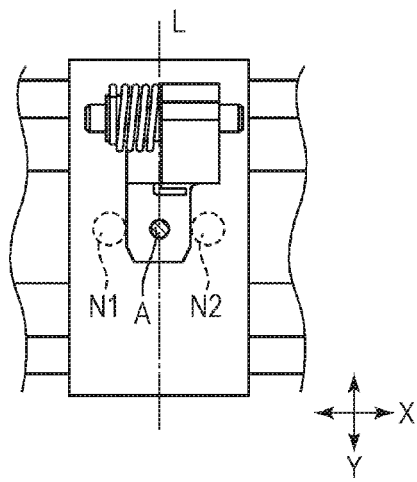
FIG. 7B is a view showing the effect of Example 2 according to the present invention.
Figure 7C:
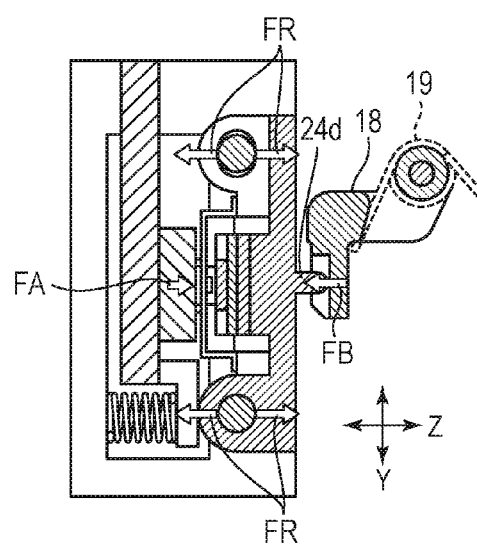
FIG. 7C is a view showing the effect of Example 2 according to the present invention.
Figure 7D:
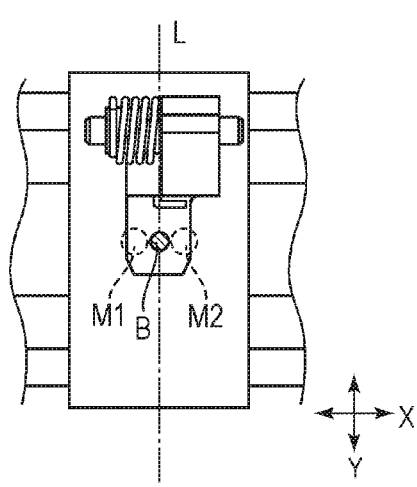
FIG. 7D is a view showing the effect of Example 2 according to the present invention.
Figure 7E:
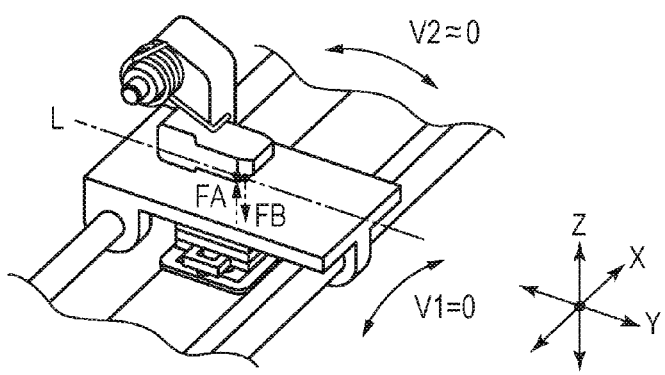
FIG. 7E is a view showing the effect of Example 2 according to the present invention.

Forces generated inside the vibration wave motor 21 according to Example 2 will be described next. FIGS. 7A and 7C are sectional views, respectively, near an abutment portion between the moving member 24 and the transmission member 18. FIGS. 7B and 7D are partially enlarged views, respectively, on an X-Y plane. FIG. 7E is a perspective view. The vibrator 1, the felt member 7, the moving member 24, the transmission member 18, and the biasing member 19 are components which move in the moving direction X, to which the friction member 2, the press members 23, the guide members 6, and the press plate 22 are fixed.

A pressure contact force FA between the vibrator 1 and the friction member 2 will be described first. As shown in FIG. 7A, the press member 23 generates a pressing force f in the direction shown in FIG. 7A to press the press plate 22 and generates a couple in the R direction shown in FIG. 7A around the shaft 22a of the press plate 22. The vibrator 1 then receives the pressure contact force FA from the friction member 2 in the direction shown in FIG. 7A. That is, the pressure contact force FA is generated between the moving vibrator 1 and the fixed friction member 2. In addition, as shown in FIG. 7B, distribution load areas N1 and N2 of the pressure contact force FA between the vibrator 1 and the friction member 2 correspond to the projected areas of protruding portions 1b of the vibrator 1. A load center A between them is the same as that in Example 1.

A biasing contact force FB between the transmission member 18 and the abutment part 24d will be described next. As shown in FIG. 7C, when the biasing member 19 generates a biasing force, the transmission member 18 is biased by the biasing force to abut against the abutment part 24d. As a result, the biasing contact force FB in the direction shown in FIG. 7C is generated between the moving transmission member 18 and the abutment part 24d. In addition, as shown in FIG. 7D, the biasing contact force FB between the transmission member 18 and the abutment part 24d has distribution load areas M1 and M2, which are the projected areas of the contact areas of the abutment part 24d with respect to a concave portion 18a of the transmission member 18. A load center B between them is the same as that in Example 1.

In this case, the vibrator 1 receives the pressure contact force FA through the press plate 22 and the friction member 2, and the moving member 24 directly receives the pressure contact force FA from the felt member 7. The vibrator 1 comes into contact with the friction member 2, and the position of the moving member 24 is restricted by the guide members 6. When, therefore, the three components, namely the vibrator 1, the felt member 7, and the moving member 24 are regarded as an integral unit, external forces acting on the unit should balance each other (the above three components regarded as an integral unit will be referred to as a "moving body" hereinafter).

As shown in FIG. 7C, the moving body receives the pressure contact force FA between the vibrator 1 and the friction member 2 and the biasing contact force FB between the transmission member 18 and the abutment part 24*d*. The directions of forces acting on the load centers A and B are opposite to each other. If the pressure contact force FA and the biasing contact force FB are equal in magnitude and the load centers A and B coincide with each other on the projections on an X-Y plane, the moving body can balance with only the pressure contact force FA and the biasing contact force FB, and no drag FR is generated between the moving body and the guide members 6. If the pressure contact force FA differs in magnitude from the biasing contact force FB, the moving body cannot balance with only the pressure contact force FA and the biasing contact force FB. In this case, the drag FR corresponding to the difference between the pressure contact force FA and the biasing contact force FB is generated between the moving body and the guide members 6 in either of the directions in FIG. 7C, in addition to the pressure contact force FA and the biasing contact force FB, thereby allowing the moving body to balance.

Features of Example 2 will be described below. The features of the arrangement according to Example 2 are the same as the first and second features of Example 1. Therefore, since no couple V1 around the Y-axis shown in FIG. 7E is generated in the moving body, the moving body can reciprocally move with high position accuracy without tilting around the Y-axis. In addition, the drag FR generated between the moving member 24 and the guide members 6 corresponds to the difference between the pressure contact force FA and the biasing contact force FB, and the drag FR and frictional force are reduced. This can prevent a decrease in the driving force of the vibration wave motor 21. In addition, making the pressure contact force FA almost equal to the biasing contact force FB can further reduce the drag FR and the frictional force. This can further prevent a decrease in the driving force of the vibration wave motor 21. As a consequence, even if the sliding guide method is used as a guide method, a decrease in the driving force of the vibration wave motor 21 can be avoided.

As described above, the linear driving apparatus using the vibration wave motor 21 according to Example 2 can use the sliding guide method as a guiding method for the moving member 24, which allows downsizing and simplification without decreasing the driving force of the vibration wave motor 21. According to Example 2, as shown in FIGS. 7B and 7D, on the projections on the X-Y plane, the load center A of the distribution load of the pressure contact force FA and the load center B of the distribution load of the biasing contact force FB fall within the range of the vibrator 1. In addition, the load center A of the distribution load of the pressure contact force FA and the load center B of the distribution load of the biasing contact force FB are aligned on a straight line L along a direction Y perpendicular to a moving direction X and a direction Z of the pressure contact force FA and almost coincide with each other. In this case, since the couple V2 shown in FIG. 7E is hardly generated, it is possible to reduce the drag FR and frictional force and a decrease in the driving force of the vibration wave motor 21 to almost 0 by making the pressure contact force FA almost equal to the biasing contact force FB.

EXAMPLE 3

Figure 8A:
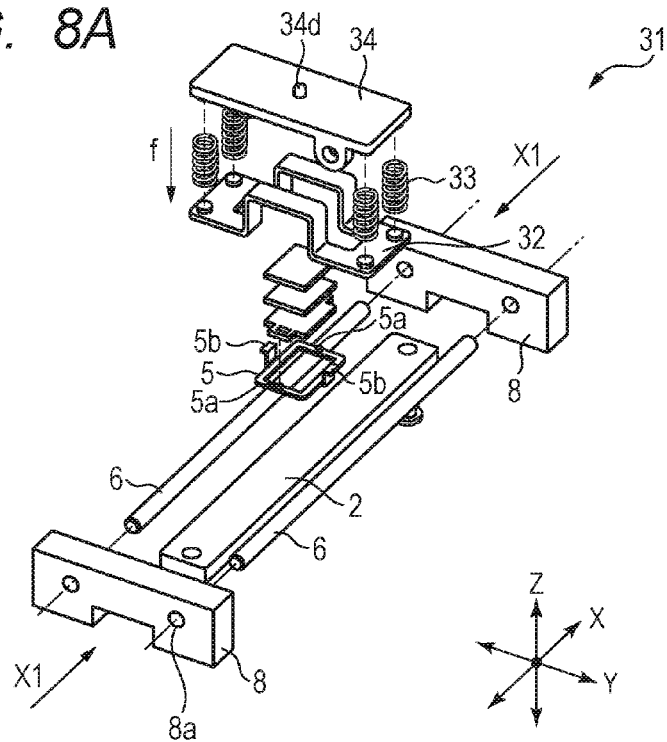
FIG. 8A is an exploded perspective view of a vibration wave motor 31 according to Example 3 of the present invention.
Figure 8B:
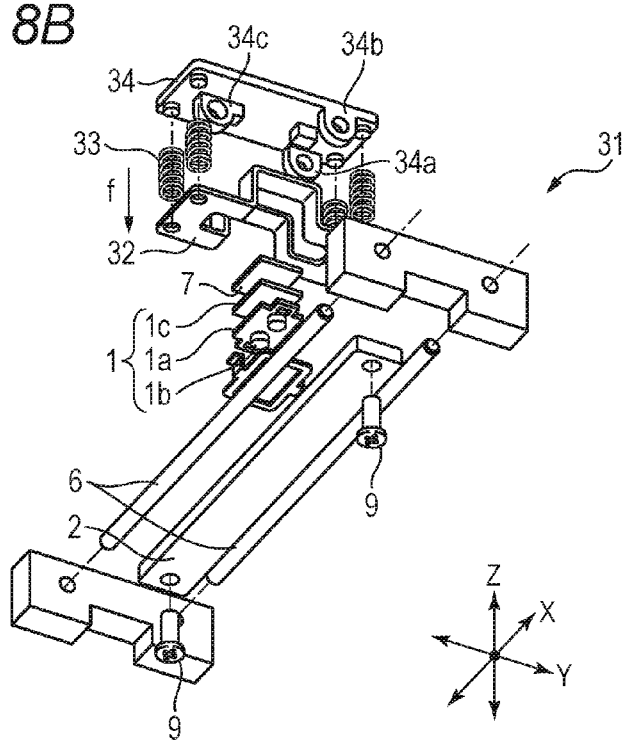
FIG. 8B is an exploded perspective view of a vibration wave motor 31 according to Example 3 of the present invention.

The arrangement of a vibration wave motor 31 according to Example 3 used for the linear driving apparatus according to the embodiment of the present invention will be described. FIGS. 8A and 8B are exploded perspective views, respectively, of the vibration wave motor 31. FIG. 8A is a view seen from above in the Z direction. FIG. 8B is a view seen from below in the Z direction. A vibrator 1 and a friction member 2 are the same as those in Example 1.

Press members 33 are four compression springs. The lower end portions of the press members 33 abut against a press plate 32 and give pressing forces f to the vibrator 1 in the direction shown in FIGS. 8A and 8B through a felt member 7. A moving member 34 can move in a moving direction X, and holds the upper end portions of the press members 33. In addition, the moving member 34 includes sliding parts 34*a*, 34*b*, and 34*c* as holes to be fitted on guide members 6 and an abutment part 34*d* against which a transmission member 18 abuts. A coupling member 5, the guide members 6, and fixing members 8 are the same as those in Example 1. With regard to each component described above, other forms can be selected as in Example 1. The transmission member 18 and a biasing member 19 through which the vibration wave motor 31 used for the linear driving apparatus according to Example 3 transmits a driving force to a driving target body 17 are the same as those in Example 1, and hence a description of them will be omitted.

Figure 9A:
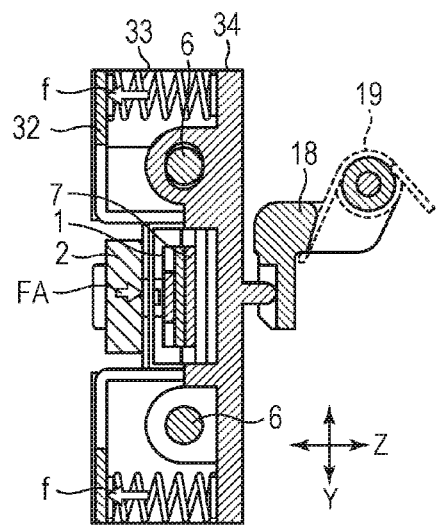
FIG. 9A is a view showing the effect of Example 3 according to the present invention.
Figure 9B:
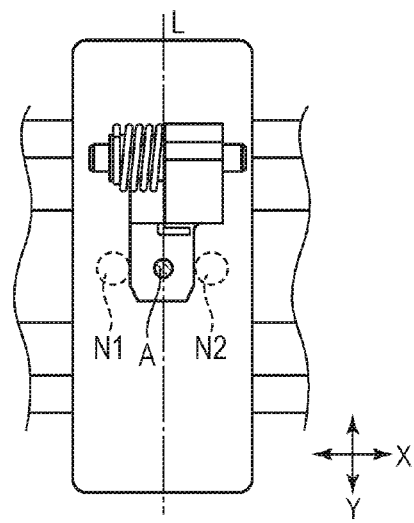
FIG. 9B is a view showing the effect of Example 3 according to the present invention.
Figure 9C:
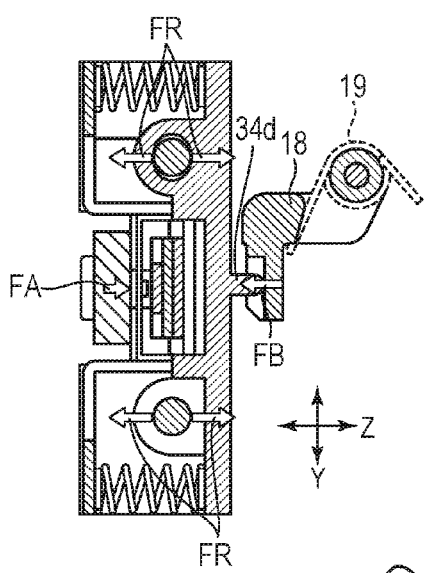
FIG. 9C is a view showing the effect of Example 3 according to the present invention.
Figure 9D:
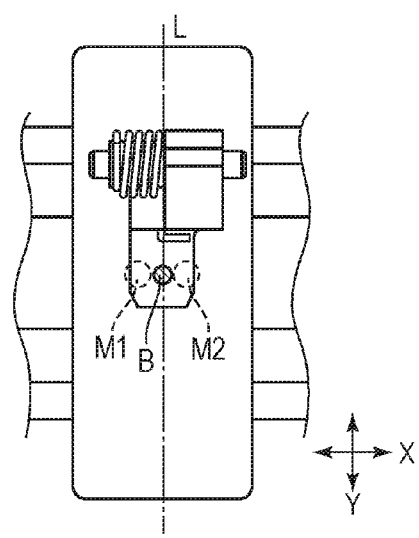
FIG. 9D is a view showing the effect of Example 3 according to the present invention.
Figure 9E:
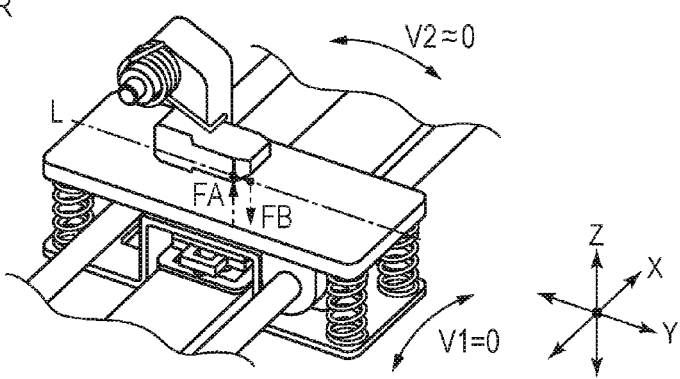
FIG. 9E is a view showing the effect of Example 3 according to the present invention.

Forces generated inside the vibration wave motor 31 according to Example 3 will be described next. FIGS. 9A and 9C are sectional views, respectively, near an abutment portion between the moving member 34 and the transmission member 18. FIGS. 9B and 9D are partially enlarged views, respectively, on an X-Y plane. FIG. 9E is a perspective view. The vibrator 1, a felt member 7, the press plate 32, the press members 33, the moving member 34, the transmission member 18, and the biasing member 19 are components which move in the X direction, to which the friction member 2 and the guide members 6 are fixed.

A pressure contact force FA between the vibrator 1 and the friction member 2 will be described first. As shown in FIG. 9A, the press members 33 generate the pressing forces f in the direction shown in FIG. 9A to press the vibrator 1 against the friction member 2 through the press plate 32 and the felt member 7. Reactive forces of the pressing forces f are then generated. The vibrator 1 receives the reactive forces from the friction member 2. That is, the pressure contact force FA is generated between the moving vibrator 1 and the fixed friction member 2. In addition, as shown in FIG. 9B, distribution load areas N1 and N2 of the pressure contact force FA between the vibrator 1 and the friction member 2 correspond to the projected areas of protruding portions 1*b* of the vibrator 1. A load center A between them is the same as that in Example 1.

A biasing contact force FB between the transmission member 18 and the abutment part 34*d* will be described next. As shown in FIG. 9C, when the biasing member 19 generates a biasing force, the transmission member 18 is biased by the biasing force to abut against the abutment part 34*d*. As a result, the biasing contact force FB in the direction shown in FIG. 9C is generated between the moving transmission member 18 and the abutment part 34*d*. In addition, as shown in FIG. 9D, the biasing contact force FB between the transmission member 18 and the abutment part 34*d* has distribution load areas M1 and M2, which are the projected areas of the contact areas of the abutment part 34*d* with respect to a concave portion 18*a* of the transmission member 18. A load center B between them is the same as that in Example 1.

In this case, the vibrator 1 receives the pressing forces f from the press members 33 through the press plate 32 and the felt member 7, and the moving member 34 directly receives forces in the opposite direction to the pressing forces f from the press members 33. The vibrator 1 comes into contact with the friction member 2, and the position of the moving member 34 is restricted by the guide members 6. When, therefore, the five components, namely the vibrator 1, the felt member 7, the press plate 32, the press members 33, and the moving member 34 are regarded as an integral unit, external forces acting on the unit should balance each other (the above five components regarded as an integral unit will be referred to as a "moving body" hereinafter).

As shown in FIG. 9C, the moving body receives the pressure contact force FA between the vibrator 1 and the friction member 2 and the biasing contact force FB between the transmission member 18 and the abutment part 34d. The directions of forces acting on the load centers A and B are opposite to each other. If the pressure contact force FA and the biasing contact force FB are equal in magnitude and the load centers A and B coincide with each other on the projections on an X-Y plane, the moving body can balance with only the pressure contact force FA and the biasing contact force FB, and no drag FR is generated between the moving body and the guide members 6. If the pressure contact force FA differs in magnitude from the biasing contact force FB, the moving body cannot balance with only the pressure contact force FA and the biasing contact force FB. In this case, the drag FR corresponding to the difference between the pressure contact force FA and the biasing contact force FB is generated between the moving body and the guide members 6 in either of the directions in FIG. 9C, in addition to the pressure contact force FA and the biasing contact force FB, thereby allowing the moving body to balance.

Features of Example 3 will be described below. The features of the arrangement according to Example 3 are the same as the first and second features of Example 1. Therefore, since no couple V1 around the Y-axis shown in FIG. 9E is generated in the moving body, the moving body can reciprocally move with high position accuracy without tilting around the Y-axis. In addition, the drag FR generated between the moving member 34 and the guide members 6 corresponds to the difference between the pressure contact force FA and the biasing contact force FB, and the drag FR and frictional force are reduced. This can prevent a decrease in the driving force of the vibration wave motor 31. In addition, making the pressure contact force FA almost equal to the biasing contact force FB can further reduce the drag FR and the frictional force. This can further prevent a decrease in the driving force of the vibration wave motor 31. As a consequence, even if the sliding guide method is used as a guide method, a decrease in the driving force of the vibration wave motor 31 can be avoided.

As described above, the linear driving apparatus using the vibration wave motor 31 according to Example 3 can use the sliding guide method as a guiding method for the moving member 34, which allows downsizing and simplification without decreasing the driving force of the vibration wave motor 31. According to Example 3, as shown in FIGS. 9B and 9D, on the projections on the X-Y plane, the load center A of the distribution load of the pressure contact force FA and the load center B of the distribution load of the biasing contact force FB fall within the range of the vibrator 1. In addition, the load center A of the distribution load of the pressure contact force FA and the load center B of the distribution load of the biasing contact force FB are aligned on a straight line L along a direction Y perpendicular to a moving direction X and a direction Z of the pressure contact force FA and almost coincide with each other. In this case, since the couple V2 shown in FIG. 9E is hardly generated, it is possible to reduce the drag FR and frictional force and a decrease in the driving force of the vibration wave motor 31 to almost 0 by making the pressure contact force FA almost equal to the biasing contact force FB.

EXAMPLE 4

Figure 10A:
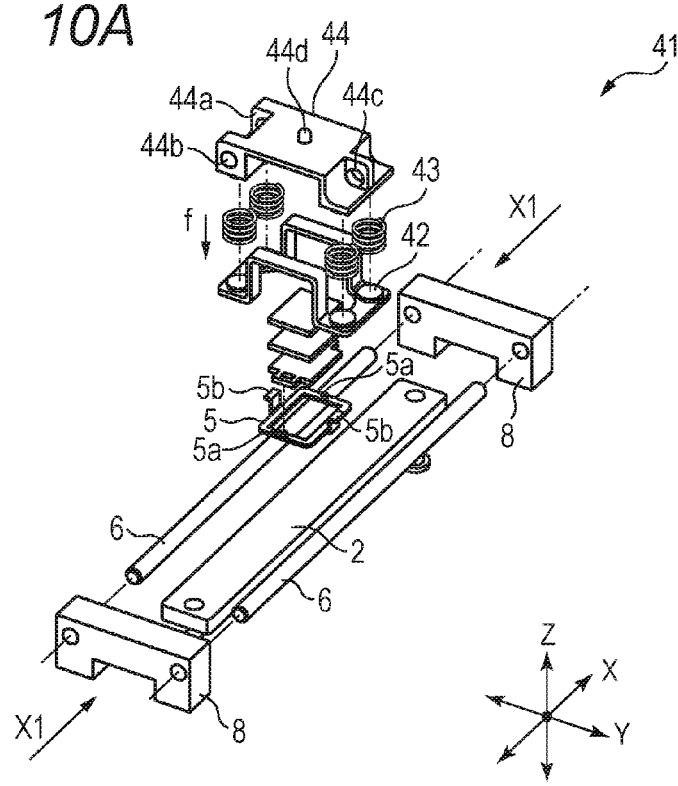
FIG. 10A is an exploded perspective view of a vibration wave motor 41 according to Example 4 of the present invention.
Figure 10B:
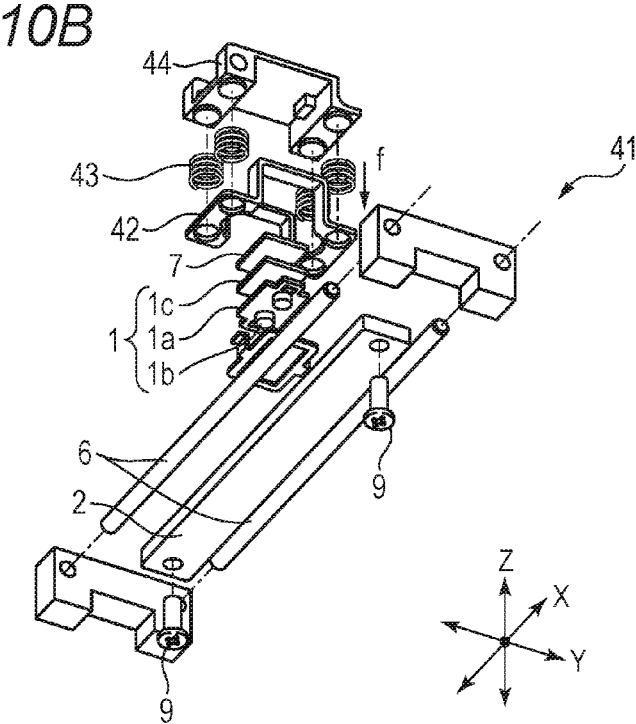
FIG. 10B is an exploded perspective view of a vibration wave motor 41 according to Example 4 of the present invention.

The arrangement of a vibration wave motor 41 according to Example 4 used for the linear driving apparatus according to the embodiment of the present invention will be described. FIGS. 10A and 10B are exploded perspective views, respectively, of the vibration wave motor 41. FIG. 10A is a view seen from above in the Z direction. FIG. 10B is a view seen from below in the Z direction. A vibrator 1 and a friction member 2 are the same as those in Example 1.

Press members 43 are four compression springs. The lower end portions of the press members 43 abut against a press plate 42 and give pressing forces f to the vibrator 1 in the direction shown in FIGS. 10A and 10B through a felt member 7. A moving member 44 can move in a moving direction X, and holds the upper end portions of the press members 43. In addition, the moving member 44 includes sliding parts 44a, 44b, and 44c as holes to be fitted on guide members 6 and an abutment part 44d against which a transmission member 18 abuts. A coupling member 5, the guide members 6, and fixing members 8 are the same as those in Example 1. With regard to each component described above, other forms can be selected as in Example 1.

The transmission member 18 and a biasing member 19 through which the vibration wave motor 41 used for the linear driving apparatus according to Example 4 transmits a driving force to a driving target body 17 are the same as those in Example 1, and hence a description of them will be omitted. In Example 4, unlike in Example 3, the press members 43 and the guide members 6 are arranged so as to overlap in the Z direction. Arranging the guide members 6 and press members 43 so as not to overlap in the Y direction in this manner can achieve downsizing in the Y direction.

Figure 11A:
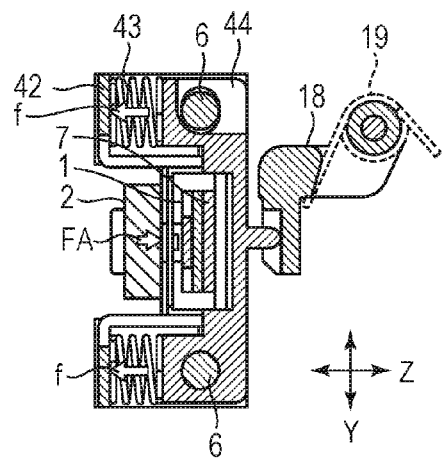
FIG. 11A is a view showing the effect of Example 4 according to the present invention.
Figure 11B:
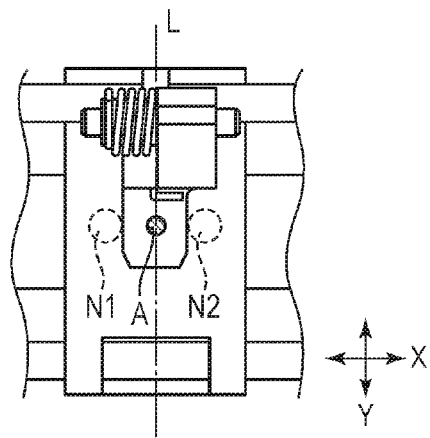
FIG. 11B is a view showing the effect of Example 4 according to the present invention.
Figure 11C:
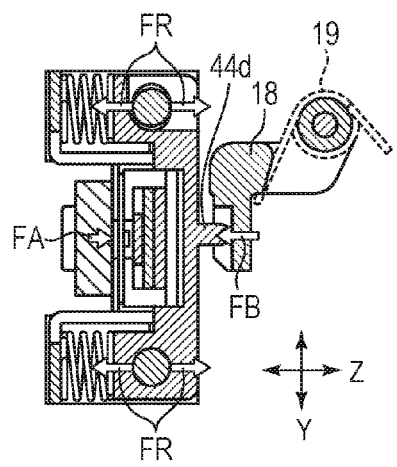
FIG. 11C is a view showing the effect of Example 4 according to the present invention.
Figure 11D:
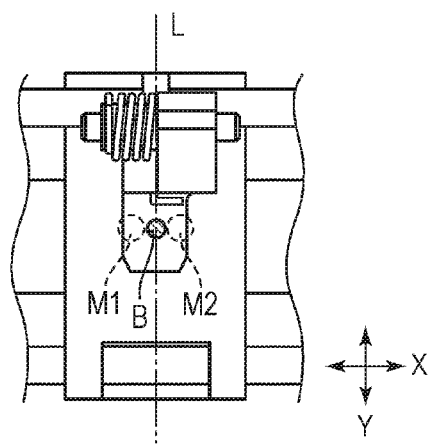
FIG. 11D is a view showing the effect of Example 4 according to the present invention.
Figure 11E:
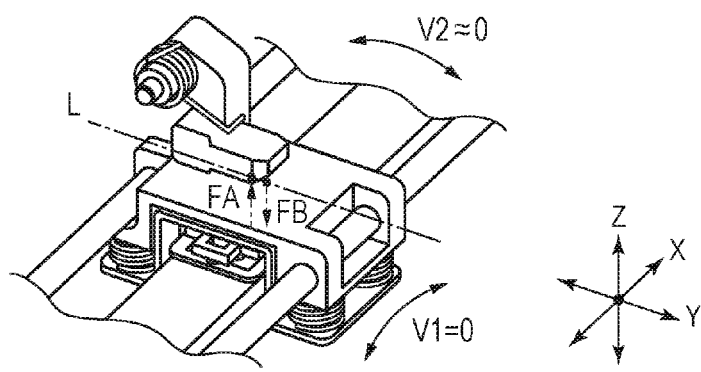
FIG. 11E is a view showing the effect of Example 4 according to the present invention.

Forces generated inside the vibration wave motor 41 according to Example 4 will be described next. FIGS. 11A and 11C are sectional views, respectively, near an abutment portion between the moving member 44 and the transmission member 18. FIGS. 11B and 11D are partially enlarged views, respectively, on an X-Y plane. FIG. 11E is a perspective view. The vibrator 1, the felt member 7, the press plate 42, the press members 43, the moving member 44, the transmission member 18, and the biasing member 19 are components which move in the X direction, to which the friction member 2 and the guide members 6 are fixed.

A pressure contact force FA between the vibrator 1 and the friction member 2 will be described first. As shown in FIG. 11A, the press members 43 generate the pressing forces f in the direction shown in FIG. 11A to press the vibrator 1 against the friction member 2 through the press plate 42 and the felt member 7. Reactive forces of the pressing forces f are then generated. The vibrator 1 receives the reactive forces from the friction member 2. That is, the pressure contact force FA is generated between the moving vibrator 1 and the fixed friction member 2. In addition, as shown in FIG. 11B, distribution load areas N1 and N2 of the pressure contact force FA between the vibrator 1 and the friction member 2 correspond to the projected areas of protruding portions 1b of the vibrator 1. A load center A between them is the same as that in Example 1.

A biasing contact force FB between the transmission member 18 and the abutment part 44d will be described next. As shown in FIG. 11C, when the biasing member 19 generates a biasing force, the transmission member 18 is biased by the biasing force to abut against the abutment part 44d. As a result, the biasing contact force FB in the direction shown in FIG. 11C is generated between the moving transmission member 18 and the abutment part 44d. In addition, as shown in FIG. 11D, the biasing contact force FB between the transmission member 18 and the abutment part 44d has distribution load areas M1 and M2, which are the projected areas of the contact areas of the abutment part 34d with respect to a concave portion 18a of the transmission member 18. A load center B between them is the same as that in Example 1.

In this case, the vibrator 1 receives the pressing forces f from the press members 43 through the press plate 42 and the felt member 7, and the moving member 44 directly receives forces in the opposite direction to the pressing forces f from the press members 43. The vibrator 1 comes into contact with the friction member 2, and the position of the moving member 44 is restricted by the guide members 6. When, therefore, the five components, namely the vibrator 1, the felt member 7, the press plate 42, the press members 43, and the moving member 44 are regarded as an integral unit, external forces acting on the unit should balance each other (the above five components regarded as an integral unit will be referred to as a "moving body" hereinafter).

As shown in FIG. 11C, the moving body receives the pressure contact force FA between the vibrator 1 and the friction member 2 and the biasing contact force FB between the transmission member 18 and the abutment part 44d. The directions of forces acting on the load centers A and B are opposite to each other. If the pressure contact force FA and the biasing contact force FB are equal in magnitude and the load centers A and B coincide with each other on the projections on an X-Y plane, the moving body can balance with only the pressure contact force FA and the biasing contact force FB, and no drag FR is generated between the moving body and the guide members 6. If the pressure contact force FA differs in magnitude from the biasing contact force FB, the moving body cannot balance with only the pressure contact force FA and the biasing contact force FB. In this case, the drag FR corresponding to the difference between the pressure contact force FA and the biasing contact force FB is generated between the moving body and the guide members 6 in either of the directions in FIG. 11C, in addition to the pressure contact force FA and the biasing contact force FB, thereby allowing the moving body to balance.

Features of Example 4 will be described below. The features of the arrangement according to Example 4 are the same as the first and second features of Example 1. Therefore, since no couple V1 around the Y-axis shown in FIG. 11E is generated in the moving body, the moving body can reciprocally move with high position accuracy without tilting around the Y-axis. In addition, the drag FR generated between the moving member 44 and the guide members 6 corresponds to the difference between the pressure contact force FA and the biasing contact force FB, and the drag FR and frictional force are reduced. This can prevent a decrease in the driving force of the vibration wave motor 41. In addition, making the pressure contact force FA almost equal to the biasing contact force FB can further reduce the drag FR and the frictional force. This can further prevent a decrease in the driving force of the vibration wave motor 41. As a consequence, even if the sliding guide method is used as a guide method, a decrease in the driving force of the vibration wave motor 41 can be avoided.

As described above, the linear driving apparatus using the vibration wave motor 41 according to Example 4 can use the sliding guide method as a guiding method for the moving member 44, which allows downsizing and simplification without decreasing the driving force of the vibration wave motor 41. According to Example 4, as shown in FIGS. 11B and 11D, on the projections on the X-Y plane, the load center A of the distribution load of the pressure contact force FA and the load center B of the distribution load of the biasing contact force FB fall within the range of the vibrator 1. In addition, the load center A of the distribution load of the pressure contact force FA and the load center B of the distribution load of the biasing contact force FB are aligned on a straight line L along a direction Y perpendicular to a moving direction X and a direction Z of the pressure contact force FA and almost coincide with each other. In this case, since the couple V2 shown in FIG. 11E is hardly generated, it is possible to reduce the drag FR and frictional force and a decrease in the driving force of the vibration wave motor 41 to almost 0 by making the pressure contact force FA almost equal to the biasing contact force FB.

EXAMPLE 5

Figure 12A:
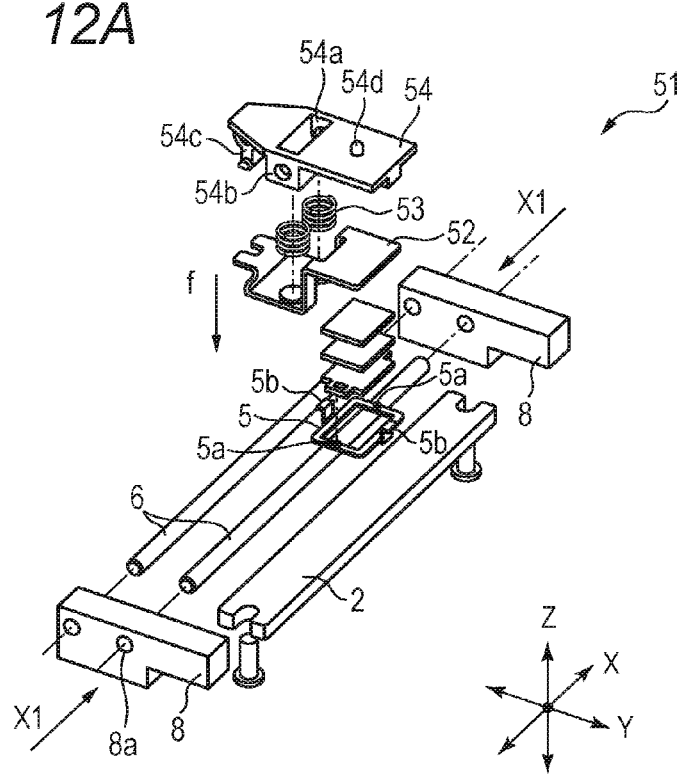
FIG. 12A is an exploded perspective view of a vibration wave motor 51 according to Example 5 of the present invention.
Figure 12B:
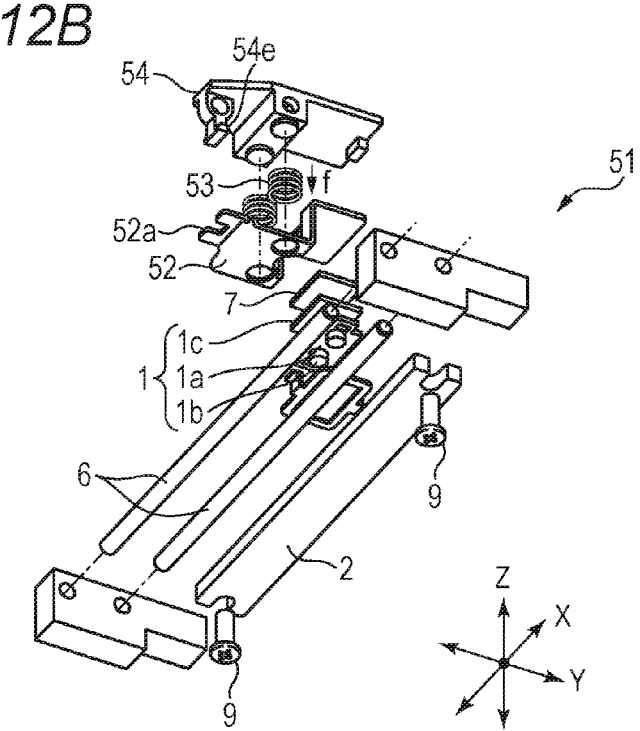
FIG. 12B is an exploded perspective view of a vibration wave motor 51 according to Example 5 of the present invention.

The arrangement of a vibration wave motor 51 according to Example 5 used for the linear driving apparatus according to the embodiment of the present invention will be described. FIGS. 12A and 12B are exploded perspective views, respectively, of the vibration wave motor 51. FIG. 12A is a view seen from above in the Z direction. FIG. 12B is a view seen from below in the Z direction. A vibrator 1 and a friction member 2 are the same as those in Example 1.

Press members 53 are two compression springs. The lower end portions of the press members 53 abut against a press plate 52 and give pressing forces f to the vibrator 1 in the direction shown in FIGS. 12A and 12B through a felt member 7. An engaging portion 52a of the press plate 52 engages with an engaging portion 54e of a moving member 54 and serves as a pivot fulcrum. A moving member 54 can move in a moving direction X, and holds the upper end portions of the press members 53. In addition, the moving member 54 includes sliding parts 54a, 54b, and 54c as holes to be fitted on guide members 6 and an abutment part 54d against which a transmission member 18 abuts. A coupling member 5, the guide members 6, and fixing members 8 are the same as those in Example 1. With regard to each component described above, other forms can be selected as in Example 1.

The transmission member 18 and a biasing member 19 through which the vibration wave motor 51 used for the linear driving apparatus according to Example 5 transmits a driving force to a driving target body 17 are the same as those in Example 1, and hence a description of them will be omitted. In Example 5, unlike in Example 1 to 4, the vibrator 1, the friction member 2, and the abutment part 54d are arranged on the end portion of the vibration wave motor 51 in the Y direction. Arranging these components in this manner increases the degree of freedom of the layout of the vibration wave motor 51 in the linear driving apparatus.

Figure 13A:
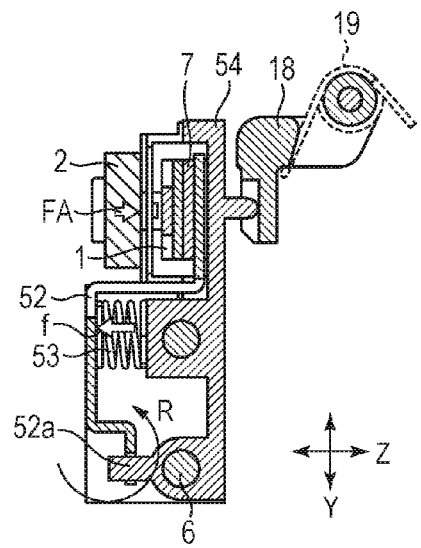
FIG. 13A is a view showing the effect of Example 5 according to the present invention.
Figure 13B:
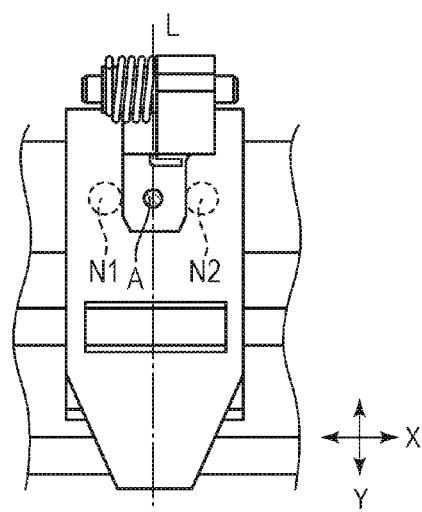
FIG. 13B is a view showing the effect of Example 5 according to the present invention.
Figure 13C:
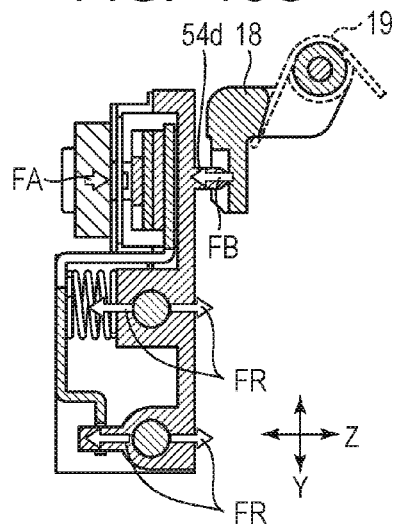
FIG. 13C is a view showing the effect of Example 5 according to the present invention.
Figure 13D:
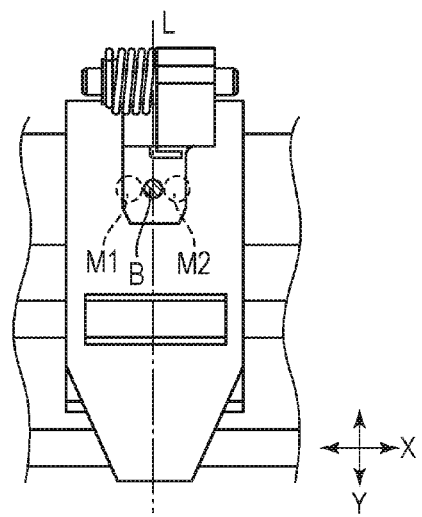
FIG. 13D is a view showing the effect of Example 5 according to the present invention.
Figure 13E:
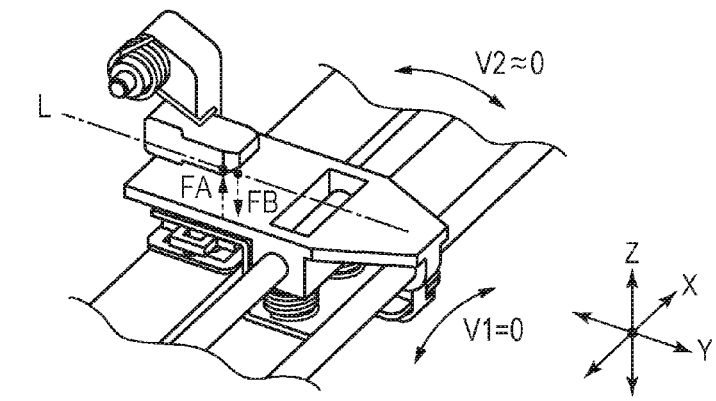
FIG. 13E is a view showing the effect of Example 5 according to the present invention.

Forces generated inside the vibration wave motor 51 according to Example 5 will be described next. FIGS. 13A and 13C are sectional views, respectively, near an abutment portion between the moving member 54 and the transmission member 18. FIGS. 13B and 13D are partially enlarged views, respectively, on an X-Y plane. FIG. 13E is a perspective view. The vibrator 1, the felt member 7, the press plate 52, the press members 53, the moving member 54, the transmission member 18, and the biasing member 19 are components which move in the X direction, to which the friction member 2 and the guide members 6 are fixed.

A pressure contact force FA between the vibrator 1 and the friction member 2 will be described first. As shown in FIG. 13A, the press members 53 generate the pressing forces f in the direction shown in FIG. 13A to press the vibrator 1 against the friction member 2 through the press plate 52 and the felt member 7. In addition, the press members 53 act to generate a couple around the engaging portion 52*a* in the R direction shown in FIG. 13A. Reactive forces of the pressing forces f are then generated. The vibrator 1 receives the reactive forces from the friction member 2. That is, the pressure contact force FA is generated between the moving vibrator 1 and the fixed friction member 2. In addition, as shown in FIG. 13B, distribution load areas N1 and N2 of the pressure contact force FA between the vibrator 1 and the friction member 2 correspond to the projected areas of protruding portions 1*b* of the vibrator 1. A load center A between them is the same as that in Example 1.

A biasing contact force FB between the transmission member 18 and the abutment part 54*d* will be described next. As shown in FIG. 13C, when the biasing member 19 generates a biasing force, the transmission member 18 is biased by the biasing force to abut against the abutment part 54*d*. As a result, the biasing contact force FB in the direction shown in FIG. 13C is generated between the moving transmission member 18 and the abutment part 54*d*. In addition, as shown in FIG. 13D, the biasing contact force FB between the transmission member 18 and the abutment part 54*d* has distribution load areas M1 and M2, which are the projected areas of the contact areas of the abutment part 54*d* with respect to a concave portion 18*a* of the transmission member 18. A load center B between them is the same as that in Example 1.

In this case, the vibrator 1 receives forces in the opposite direction to the pressure contact force FA from the press members 53 through the press plate 52 and the felt member 7, and the moving member 54 directly receives forces in the opposite direction to the pressing forces f from the press members 53. The vibrator 1 comes into contact with the friction member 2, and the position of the moving member 54 is restricted by the guide members 6. When, therefore, the five components, namely the vibrator 1, the felt member 7, the press plate 52, the press members 53, and the moving member 54 are regarded as an integral unit, external forces acting on the unit should balance each other (the above five components regarded as an integral unit will be referred to as a "moving body" hereinafter).

As shown in FIG. 13C, the moving body receives the pressure contact force FA between the vibrator 1 and the friction member 2 and the biasing contact force FB between the transmission member 18 and the abutment part 54*d*. The directions of forces acting on the load centers A and B are opposite to each other. If the pressure contact force FA and the biasing contact force FB are equal in magnitude and the load centers A and B coincide with each other on the projections on an X-Y plane, the moving body can balance with only the pressure contact force FA and the biasing contact force FB, and no drag FR is generated between the moving body and the guide members 6. If the pressure contact force FA differs in magnitude from the biasing contact force FB, the moving body cannot balance with only the pressure contact force FA and the biasing contact force FB. In this case, the drag FR corresponding to the difference between the pressure contact force FA and the biasing contact force FB is generated between the moving body and the guide members 6 in either of the directions in FIG. 13C, in addition to the pressure contact force FA and the biasing contact force FB, thereby allowing the moving body to balance.

Features of Example 5 will be described below. The features of the arrangement according to Example 5 are the same as the first and second features of Example 1. Therefore, since no couple V1 in the X direction shown in FIG. 13E is generated, the moving body can reciprocally move with high position accuracy without tilting around the X direction. In addition, the drag FR generated between the moving member 54 and the guide members 6 corresponds to the difference between the pressure contact force FA and the biasing contact force FB, and the drag FR and frictional force are reduced. This can prevent a decrease in the driving force of the vibration wave motor 51. In addition, making the pressure contact force FA almost equal to the biasing contact force FB can further reduce the drag FR and the frictional force. This can further prevent a decrease in the driving force of the vibration wave motor 51. As a consequence, even if the sliding guide method is used as a guide method, a decrease in the driving force of the vibration wave motor 51 can be avoided.

As described above, the linear driving apparatus using the vibration wave motor 51 according to Example 5 can use the sliding guide method as a guiding method for the moving member 54, which allows downsizing and simplification without decreasing the driving force of the vibration wave motor 51. According to Example 5, as shown in FIGS. 13B and 13D, on the projections on the X-Y plane, the load center A of the distribution load of the pressure contact force FA and the load center B of the distribution load of the biasing contact force FB fall within the range of the vibrator 1. In addition, the load center A of the distribution load of the pressure contact force FA and the load center B of the distribution load of the biasing contact force FB are aligned on a straight line L along a direction Y perpendicular to a moving direction X and a direction Z of the pressure contact force FA and almost coincide with each other. In this case, since the couple V2 shown in FIG. 13E is hardly generated, it is possible to reduce the drag FR and frictional force and a decrease in the driving force of the vibration wave motor 51 to almost 0 by making the pressure contact force FA almost equal to the biasing contact force FB.

First Modification

Figure 14A:
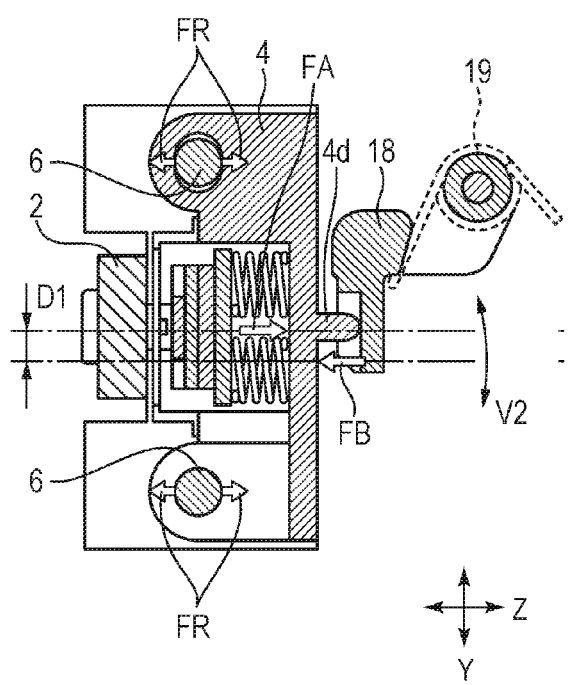
FIG. 14A is a view showing another example according to the present invention.
Figure 14B:
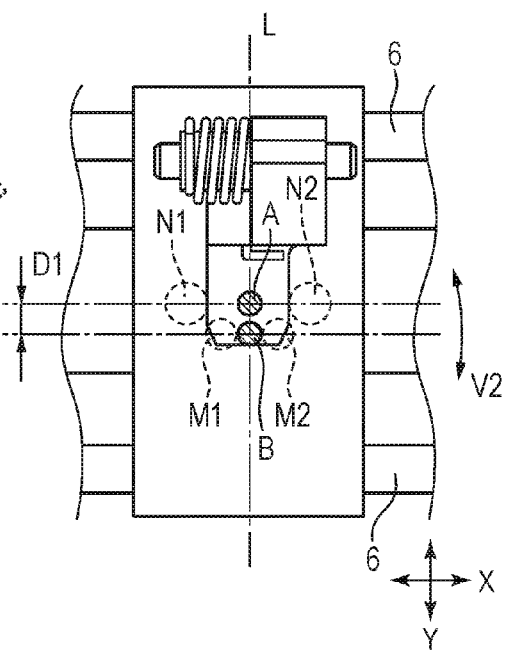
FIG. 14B is a view showing another example according to the present invention.

FIGS. 14A and 14B show the first modification of Examples 1 to 5. FIG. 14A is a sectional view near an abutment portion between the moving member 4 and the transmission member 18. FIG. 14B is a partially enlarged view on an X-Y plane. According to the first modification, on the projections on the X-Y plane, the load center A of the distribution load of the pressure contact force FA and the load center B of the distribution load of the biasing contact force FB are aligned in the direction Y perpendicular to the moving direction X and the direction Z of the pressure contact force FA but are not aligned in the moving direction X. That is, the load center A and the load center B do not coincide with each other and are spaced apart from each other to a certain extent. Assume that this degree of separation is defined as a shift amount D1. Note that the shift amount D1 is emphatically shown. This arrangement can obtain the effect of reducing the drag FR and frictional force and preventing a decrease in the driving force of the vibration wave motor by reducing the shift amount D1 and setting the couple V2 generated in the direction shown in FIGS. 14A and 14B to a very small value. In addition, the presence of the couple V2 can shift backlash around the guide members 6 to one side, and hence the arrangement can obtain the effect of reducing the vibration of the moving member 4 and preventing the generation of unnecessary vibration and noise of the apparatus.

Second Modification

Figure 14C:
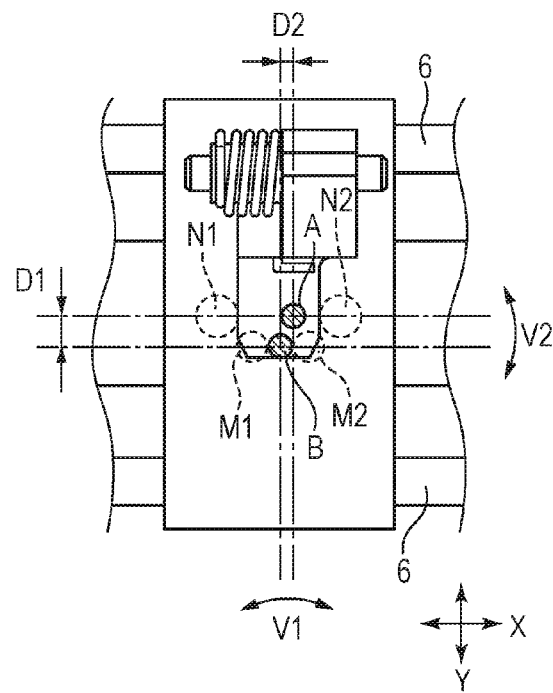
FIG. 14C is a view showing another example according to the present invention.

In addition, FIG. 14C shows the second modification of Examples 1 to 5. FIG. 14C is a partially enlarged view on an X-Y plane. According to the second modification, on the projections on the X-Y plane perpendicular to the direction Z, the load center A of the distribution load of the pressure contact force FA and the load center B of the distribution load of the biasing contact force FB fall within the range of the vibrator 1 but are not aligned in both the moving direction X and the direction Y perpendicular to the moving direction X. Note however that a shift amount D1 between the load center A and the load center B in the direction Y perpendicular to the moving direction X and a shift amount D2 between them in the moving direction X are emphatically shown. This arrangement can obtain the effect of reducing the drag FR and frictional force and preventing a decrease in the driving force of the vibration wave motor by setting the shift amounts D1 and D2 to small values. As described above, even if the load center A of the pressure contact force FA and the load center B of the biasing contact force FB are not aligned in either or both of the moving direction X and the direction Y perpendicular to the moving direction X, similar effects can be obtained.

Third Modification

Figure 15:
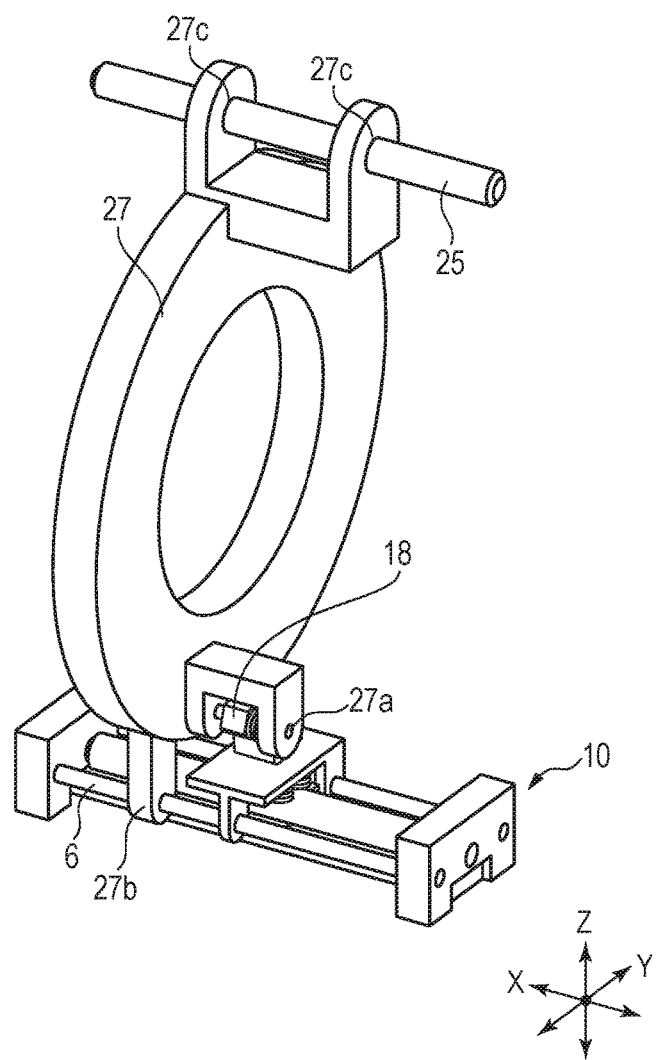
FIG. 15 is a view showing a linear driving apparatus according to another embodiment to which the present invention is applied.
Figure 16:
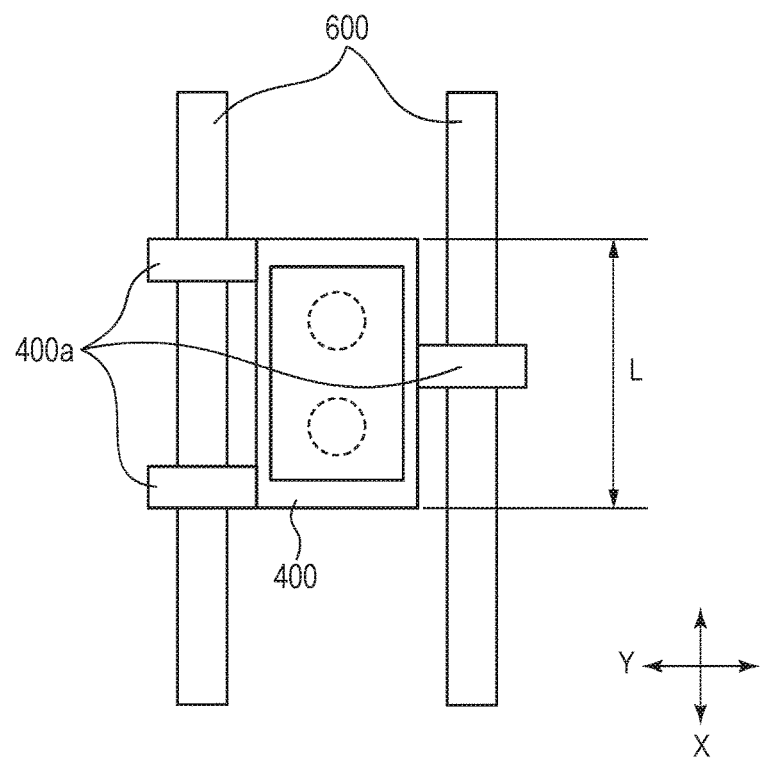
FIG. 16 is a view showing an arrangement for a guiding method using guide shafts 600 according to the related art.

FIG. 15 shows the third modification of Examples 1 to 5. FIG. 15 is a perspective view of an optical apparatus using the linear driving apparatus using the vibration wave motor 10. A driving target body 27 is a lens frame used for a photographing apparatus as a driving target, to which the vibration wave motor 10 outputs a driving force, and is featured in that guide holes 27c on one side are guided along a guide shaft 25, and guide holes 27b on the other side are guided along the guide member 6 of the vibration wave motor 10. The transmission member 18 is held by a support portion 27a. This arrangement can obtain the effect of reducing the number of components to be used and simplifying the apparatus, and can also obtain the effect of improving the linear motion accuracy because the vibration wave motor 10 and the driving target body 27 are guided by the same guide member 6. According to the third modification, one guide member 6 is shared. However, two guide members 6 can be shared. In the third embodiment, other arrangements can be selected, as in Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-128543, filed Jun. 26, 2015, which is hereby incorporated by reference herein in its entirety.

REFERENCE SIGNS LIST 1 vibrator
1c piezoelectric element
2 friction member
3 press member (13, 23, 33, 43, 53)
4 moving member (14, 24, 34, 44, 54)
4d abutment part (14d, 24d, 34d, 44d, 54d)
5 coupling member
6 guide member
10 vibration wave motor (11, 21, 31, 41, 51)
17 driving target body
18 transmission member
19 biasing member
A, B load center
FA pressure contact force
FB biasing contact force
X moving direction

The invention claimed is:

1. A linear driving apparatus comprising:
 (A) a vibration wave motor including:
  a vibrator including a piezoelectric element which generates vibration,
  a friction member fixed to face the vibrator,
  a press member which applies a pressing force between the vibrator and the friction member,
  a moving member which is configured to move in a predetermined moving direction,
  a coupling member which couples the vibrator to the moving member and synchronously moves the vibrator and the moving member, and
  a guide member which slidably guides the moving member in the moving direction;
 (B) a driving target body which is configured to move in the moving direction;
 (C) a transmission member which is supported by the driving target body, abuts against an abutment part of the moving member, and synchronously moves the vibration wave motor and the driving target body; and
 (D) a biasing member which applies a biasing force between the transmission member and the abutment part,
  wherein a direction of a pressure contact force which the vibrator receives from the friction member and a direction of a biasing contact force which the abutment part receives from the biasing member are parallel and opposite directions, and
  a load center of a distribution load of the biasing contact force falls within a range of the vibrator.

2. A linear driving apparatus according to claim 1, wherein a load center of a distribution load of the pressure contact force and the load center of the distribution load of the biasing contact force are aligned in a direction perpendicular to the moving direction and a direction of the pressure contact force on a plane perpendicular to the direction of the pressure contact force.

3. A linear driving apparatus according to claim 2, wherein the load center of the distribution load of the pressure contact force and the load center of the distribution load of the biasing contact force substantially coincide with each other on the plane.

4. A linear driving apparatus according to claim 1, wherein an area where the press member exists and an area where one of the friction member and the vibrator exists overlap each other on projections on a plane parallel to the moving direction and a direction of the biasing contact force.

5. A linear driving apparatus according to claim 1, wherein the guide member guides the driving target body in the moving direction.

6. A linear driving apparatus according to claim 1, wherein the vibration wave motor comprises an ultrasonic motor whose vibration is ultrasonic vibration.

7. An optical apparatus using a linear driving apparatus, the linear driving apparatus comprising:
 (A) a vibration wave motor including:
  a vibrator including a piezoelectric element which generates vibration, a friction member fixed to face the vibrator, a press member which applies a pressing force between the vibrator and the friction member, a moving member which is configured to move in a predetermined moving direction a coupling member which couples the vibrator to the moving member and synchronously moves the vibrator and the moving member, and a guide member which slidably guides the moving member in the moving direction;

(B) a driving target body which is configured to move in the moving direction;

(C) a transmission member which is supported by the driving target body, abuts against an abutment part of the moving member, and synchronously moves the vibration wave motor and the driving target body; and (D) a biasing member which applies a biasing force between the transmission member and the abutment part, wherein a direction of a pressure contact force which the vibrator receives from the friction member and a direction of a biasing contact force which the abutment part receives from the biasing member are parallel and opposite directions, a load center of a distribution load of the biasing contact force falls within a range of the vibrator, and the driving target body comprises a lens frame which holds a lens.

* * * * *